(12) United States Patent
Sato

(10) Patent No.: US 11,912,236 B2
(45) Date of Patent: Feb. 27, 2024

(54) VEHICLE RAMP DEVICE

(71) Applicant: AISIN CORPORATION, Aichi (JP)

(72) Inventor: Eisuke Sato, Kariya (JP)

(73) Assignee: AISIN CORPORATION, Aichi (JP)

( * ) Notice: Subject to any disclaimer, the term of this patent is extended or adjusted under 35 U.S.C. 154(b) by 709 days.

(21) Appl. No.: 17/078,791

(22) Filed: Oct. 23, 2020

(65) Prior Publication Data

US 2021/0122295 A1 Apr. 29, 2021

(30) Foreign Application Priority Data

Oct. 24, 2019 (JP) .................. 2019-193393

(51) Int. Cl.
*B60R 3/00* (2006.01)
*A61G 3/06* (2006.01)

(52) U.S. Cl.
CPC ................ *B60R 3/00* (2013.01); *A61G 3/061* (2013.01); *A61G 3/067* (2016.11)

(58) Field of Classification Search
CPC ........... B60P 1/433; B60P 1/431; B60P 1/436; A61G 3/061; A61G 3/067
See application file for complete search history.

(56) References Cited

U.S. PATENT DOCUMENTS

| | | | |
|---|---|---|---|
| 5,676,515 A * | 10/1997 | Haustein | B60P 1/431 414/921 |
| 8,926,254 B2 | 1/2015 | Pocobello et al. | |
| 9,603,758 B1 * | 3/2017 | Perez | B60P 1/433 |
| 2006/0245883 A1 * | 11/2006 | Fontaine | A61G 3/067 414/537 |
| 2011/0146008 A1 * | 6/2011 | Hansen | A61G 3/067 14/71.1 |
| 2019/0106042 A1 * | 4/2019 | Hill | B60P 1/431 |
| 2019/0247248 A1 * | 8/2019 | Perkins | A61G 3/061 |
| 2021/0170933 A1 * | 6/2021 | Smith | A61G 3/067 |
| 2022/0409452 A1 * | 12/2022 | Kotagi | A61G 3/061 |

FOREIGN PATENT DOCUMENTS

WO WO-2009105532 A2 * 8/2009 ............. A61G 3/061

* cited by examiner

*Primary Examiner* — Kaitlin S Joerger

(74) *Attorney, Agent, or Firm* — Oblon, McClelland, Maier & Neustadt, L.L.P.

(57) ABSTRACT

A vehicle ramp device includes a ramp plate deployed at a lower end of a door opening, a moving body moving in a deploying or retracting direction of the ramp plate, a support arm rotatably connected to the ramp plate and the moving body to allow a rear end portion of the ramp plate to be lifted up when the ramp plate is deployed, a fall prevention member rotatably connected to the ramp plate, an urging member urging the fall prevention member to make it stand on a side end portion of the ramp plate, and a pressing member abutting against the fall prevention member that moves downward together with the ramp plate having been lifted up based on a rotation of the support arm and pressing the fall prevention member to bend it on a top surface of the ramp plate against an urging force of the urging member.

9 Claims, 14 Drawing Sheets

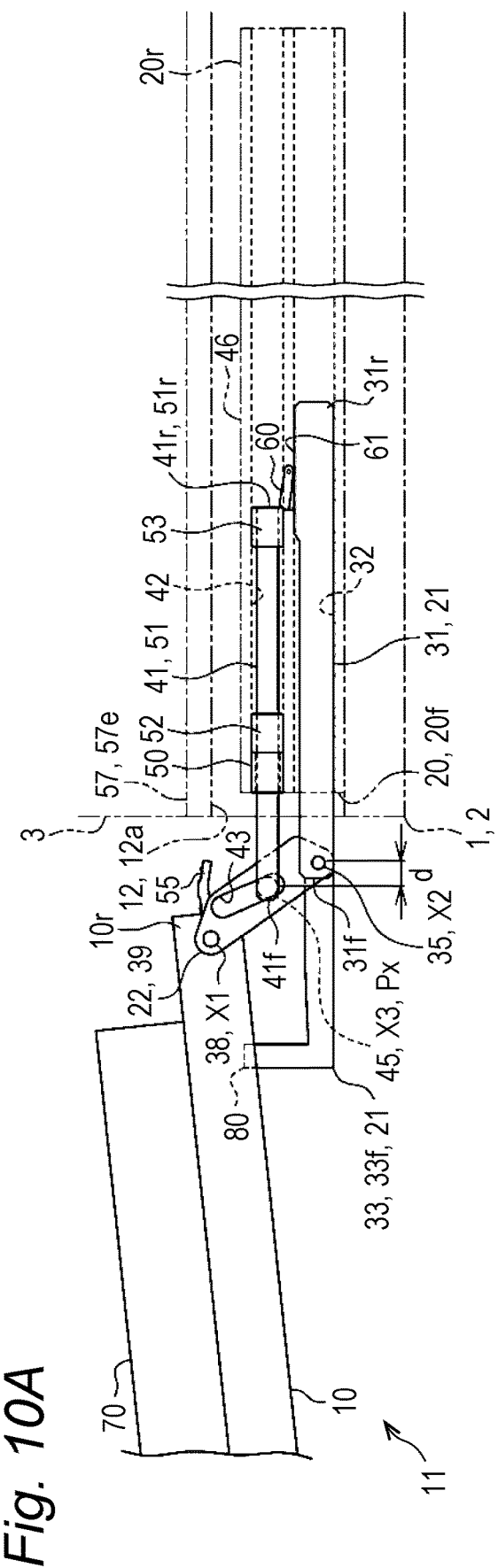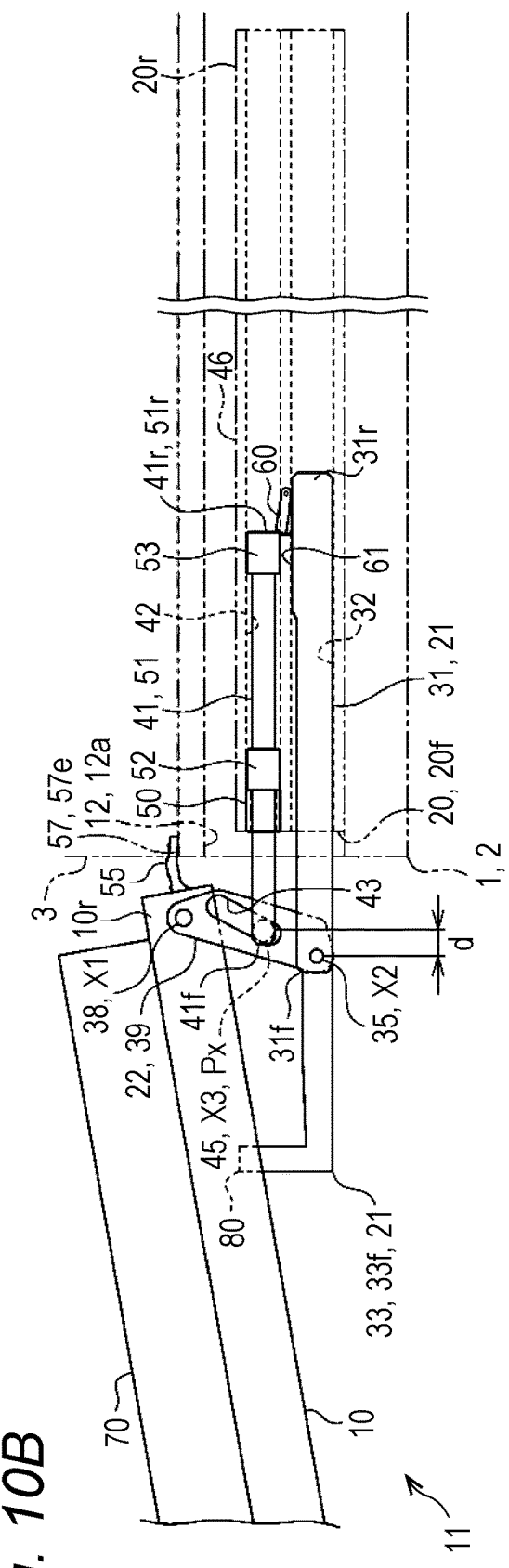

US 11,912,236 B2

VEHICLE RAMP DEVICE

CROSS REFERENCE TO RELATED APPLICATIONS

This application is based on and claims priority under 35 U.S.C. § 119 to Japanese Patent Application No. 2019-193393, filed on Oct. 24, 2019, the entire content of which is incorporated herein by reference

TECHNICAL FIELD

This disclosure relates to a vehicle ramp device.

BACKGROUND DISCUSSION

Conventionally, there has been provided a vehicle ramp device that deploys a ramp plate at a lower end of a door opening. For example, the ramp device described in U.S. Pat. No. 8,926,254 B2 moves a ramp plate stored under the floor of a vehicle in a deploying or retracting direction based on the driving force of an actuator. In addition, this ramp device includes a fence functioning as a fall prevention member formed on a side end portion of the ramp plate. Specifically, this ramp device includes a spring fence functioning as a fall prevention member that is rotatably connected to the ramp plate while being urged in a standing direction. The ramp device also has a cam surface that is in sliding contact with the spring fence when the ramp plate is moved in the deploying or retracting direction. The ramp plate is retracted in a state where the spring fence is pressed against the cam surface to be bent.

However, in the configuration of the conventional technique described above, when the ramp plate is moved in a retracting direction, the cam surface that is in sliding contact with a spring fence presses the spring fence and bends the spring fence. As a result, the driving force required to move the ramp plate in the deploying or retracting direction increases, and the spring fence may wear and sliding noise may occur. Therefore, there is still a need for improvement.

A need thus exists for a vehicle ramp device which is not susceptible to the drawback mentioned above.

SUMMARY

A vehicle ramp device includes a ramp plate that is deployed at a lower end of a door opening, a moving body that moves in a deploying or retracting direction of the ramp plate, a support arm that is rotatably connected to the ramp plate and is rotatably connected to the moving body to allow a rear end portion of the ramp plate to be lifted up in a state where the ramp plate is deployed, a fall prevention member that is rotatably connected to the ramp plate, an urging member that urges the fall prevention member to make the fall prevention member stand on a side end portion of the ramp plate, and a pressing member that abuts against the fall prevention member that moves downward together with the ramp plate having been lifted up based on a rotation of the support arm and presses the fall prevention member to bend the fall prevention member on a top surface of the ramp plate against an urging force of the urging member.

BRIEF DESCRIPTION OF THE DRAWINGS

The foregoing and additional features and characteristics of this disclosure will become more apparent from the following detailed description considered with the reference to the accompanying drawings, wherein:

FIGS. 10A and 10B are side views of the ramp device;

DETAILED DESCRIPTION

Hereinafter, an embodiment in which a vehicle ramp device is embodied will be described with reference to the drawings.

Figure 1:
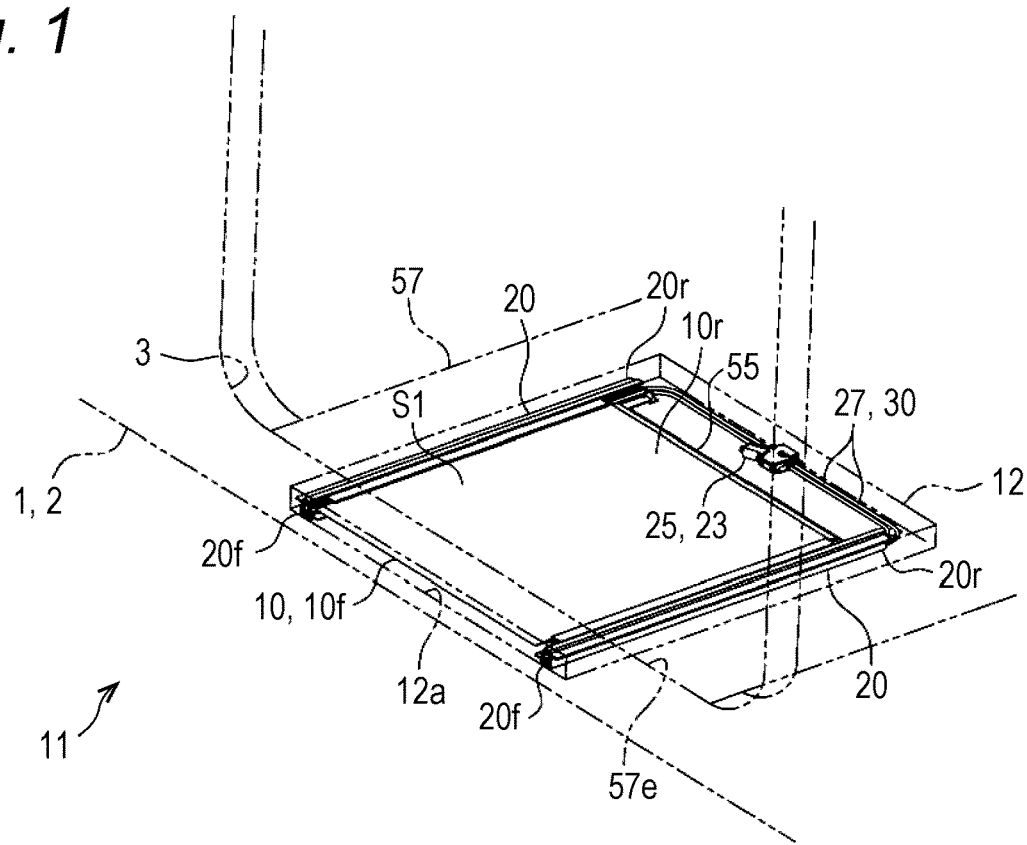
FIG. 1 is a perspective view of a ramp device disposed below a door opening.
Figure 2:
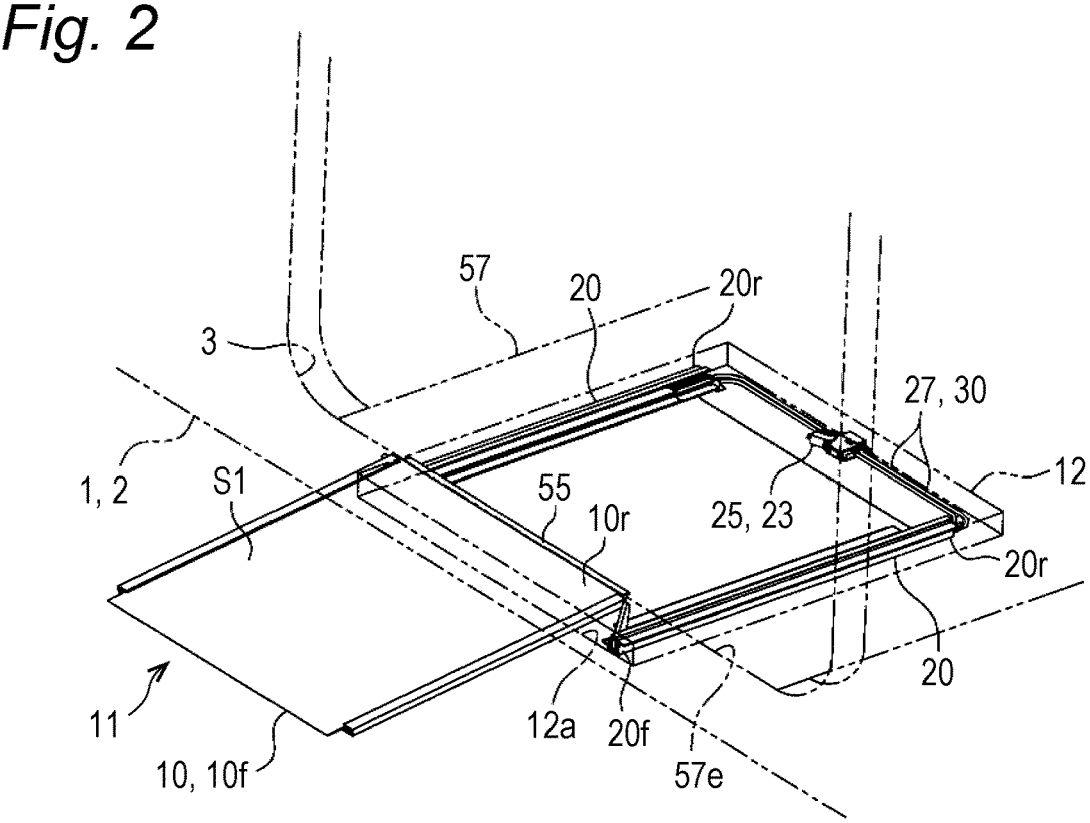
FIG. 2 is a perspective view of the ramp device disposed below the door opening.

As illustrated in FIGS. 1 and 2, a vehicle 1 of the present embodiment includes a ramp device 11 that deploys a ramp plate 10 at a lower end of a door opening 3 formed in a vehicle body 2. In the vehicle 1 of the present embodiment, the ramp device 11 is installed in a storage box 12 disposed below the door opening 3. Specifically, the storage box 12 has an opening 12a on the same side as the door opening 3. The ramp device 11 according to the present embodiment is configured to deploy the ramp plate 10 retracted into the storage box 12 to the outside of the vehicle and retract the deployed ramp plate 10 again into the storage box 12 through the opening 12a.

For example, a rear opening (back door) of the vehicle 1, or a side opening (side door) of the vehicle 1 that is opened and closed by a slide door or a so-called glide door is assumed to be the door opening 3 in which the ramp device 11 is installed. The ramp plate 10 that is deployed in such a door opening 3 is used to easily load a wheelchair, a bicycle, or the like into a vehicle interior.

More specifically, the ramp device 11 according to the present embodiment includes paired guide rails 20, 20 that extend in a direction of deploying or retracting the ramp plate 10 deployed from the storage box 12 to the lower end of the door opening 3, that is, in a depth direction of the storage box 12. In the ramp device 11 according to the present embodiment, these guide rails 20, 20 are arranged substantially in parallel so as to sandwich the ramp plate 10 within the storage box 12 from both sides in a width direction.

Figure 3:
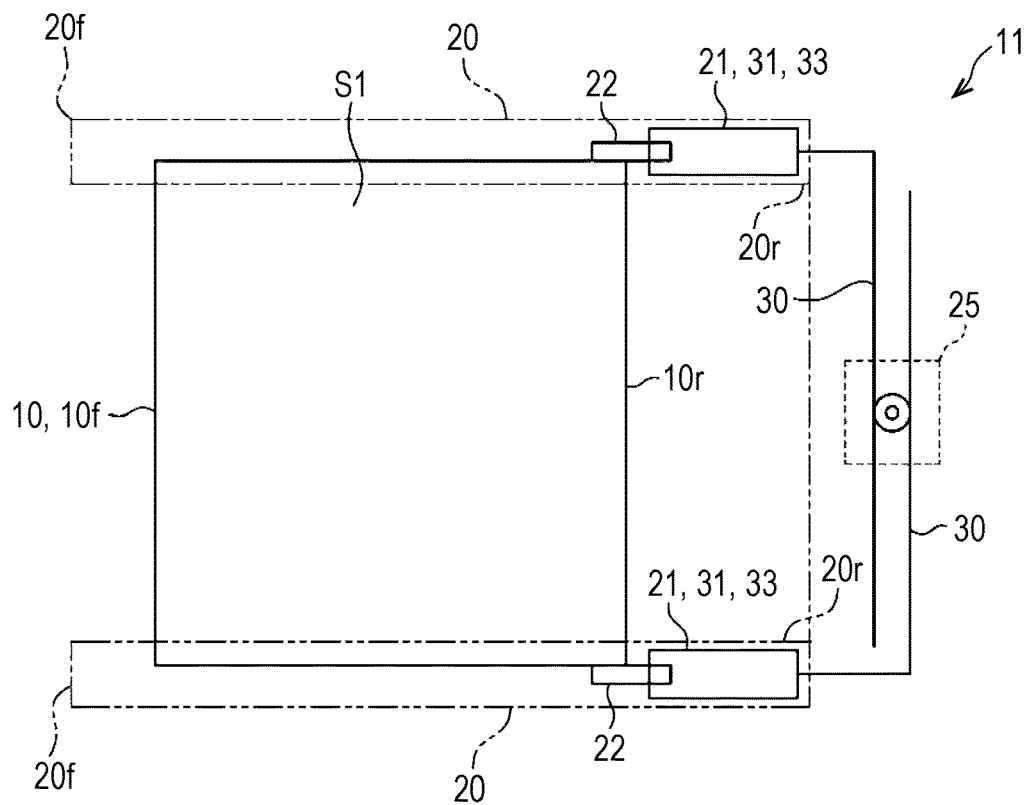
FIG. 3 is a schematic configuration view of the ramp device.
Figure 4:
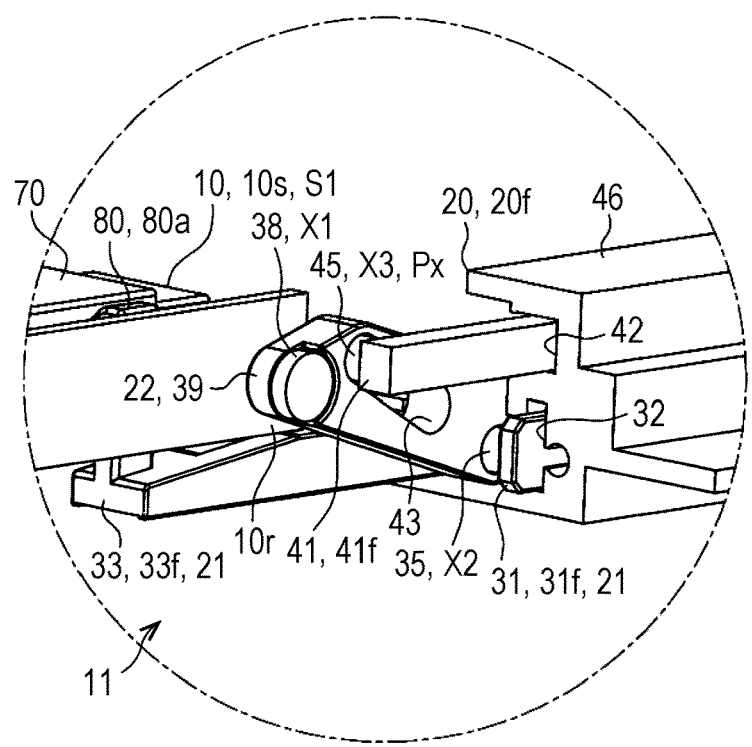
FIG. 4 is a perspective view of the ramp device.

As illustrated in FIG. 3, the ramp device 11 according to the present embodiment includes moving bodies 21, 21 that are engaged with the guide rails 20, 20 to be slidable along the extending direction of the guide rails 20, 20. The ramp device 11 also includes paired support arms 22, 22 each of which is interposed between each of the moving bodies 21, 21 and the ramp plate 10. The ramp device 11 according to the present embodiment is thus configured such that the ramp plate 10 is moved in the deploying or retracting direction together with the moving bodies 21, 21 and the support arms 22, 22.

More specifically, as illustrated in FIGS. 1 to 3, the ramp device 11 according to the present embodiment includes an actuator 25 that uses a motor 23 as a drive source. In the ramp device 11 according to the present embodiment, the actuator 25 is disposed in the storage box 12 behind rear end portions 20r of the guide rails 20, 20. The ramp device 11 also includes casing pipes 27, 27 that connect the actuator 25 to the rear end portions 20r of the guide rails 20, 20, and paired drive cables 30, 30 routed along the extending direction of the casing pipes 27, 27 and the guide rails 20, 20. The ramp device 11 according to the present embodiment is configured such that the moving bodies 21, 21 are moved along the extending direction of the guide rails 20, 20 based on the driving force of the actuator 25 that is transmitted via the drive cables 30, 30.

As illustrated in FIGS. 4, 5A, 5B, and 6 to 8, the ramp device 11 according to the present embodiment includes a drive shoe 31 that is driven by the actuator 25 through the drive cable 30 to constitute the moving body 21. In the ramp device 11 according to the present embodiment, the drive shoe 31 has an outer shape of a substantially elongated rod. The guide rail 20 of the present embodiment has a groove-like drive guide portion 32 extending in the extending direction of the guide rail 20. The drive shoe 31 of the present embodiment is disposed within the drive guide portion 32 in a state of extending along the extending direction of the guide rail 20.

Figure 6:
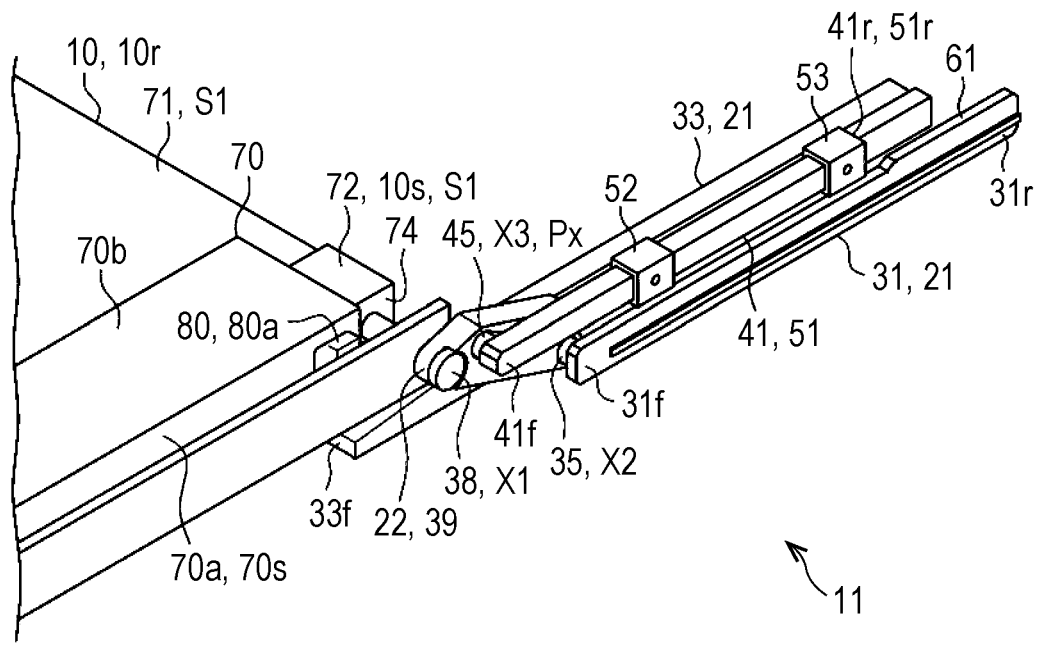
FIG. 6 is a perspective view of the ramp device.
Figure 7:
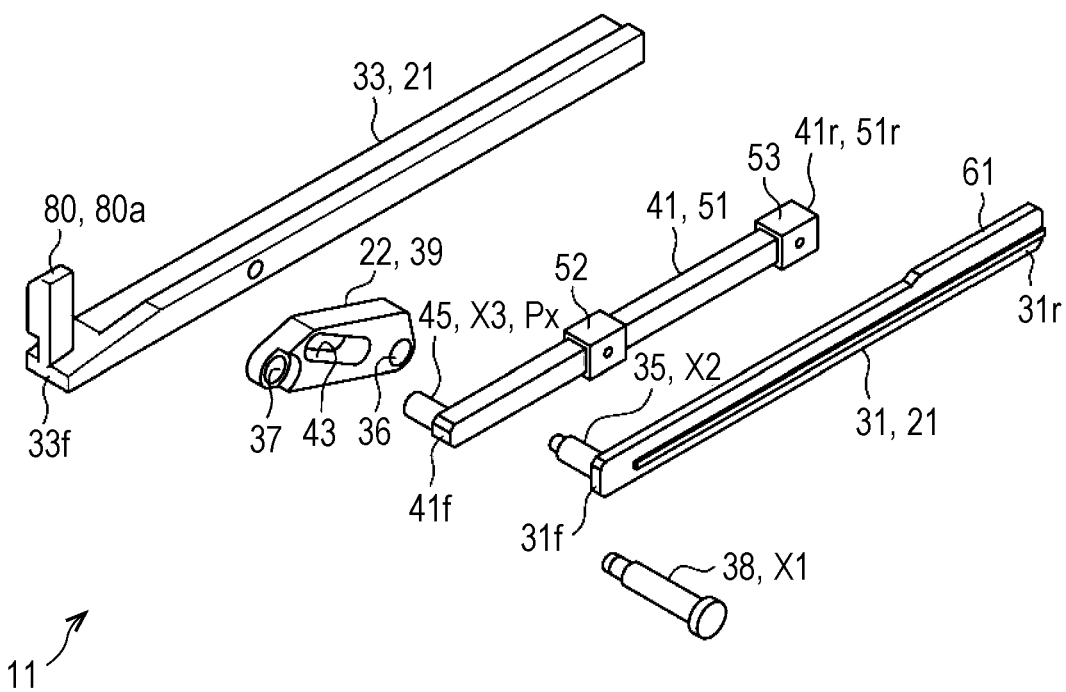
FIG. 7 is an exploded perspective view of the ramp device.
Figure 8:
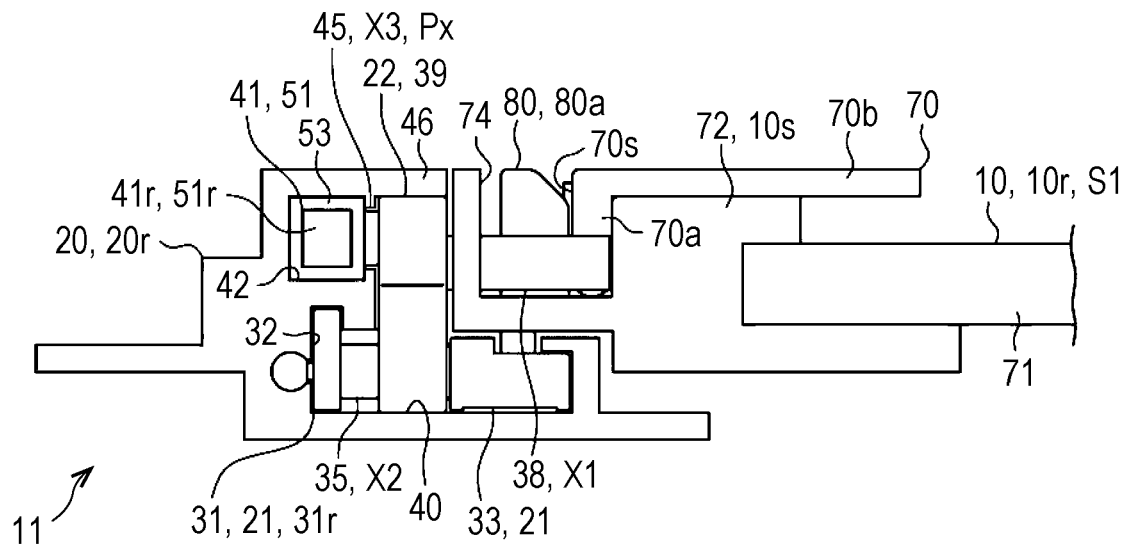
FIG. 8 is a rear view of the ramp device.
Figure 9:
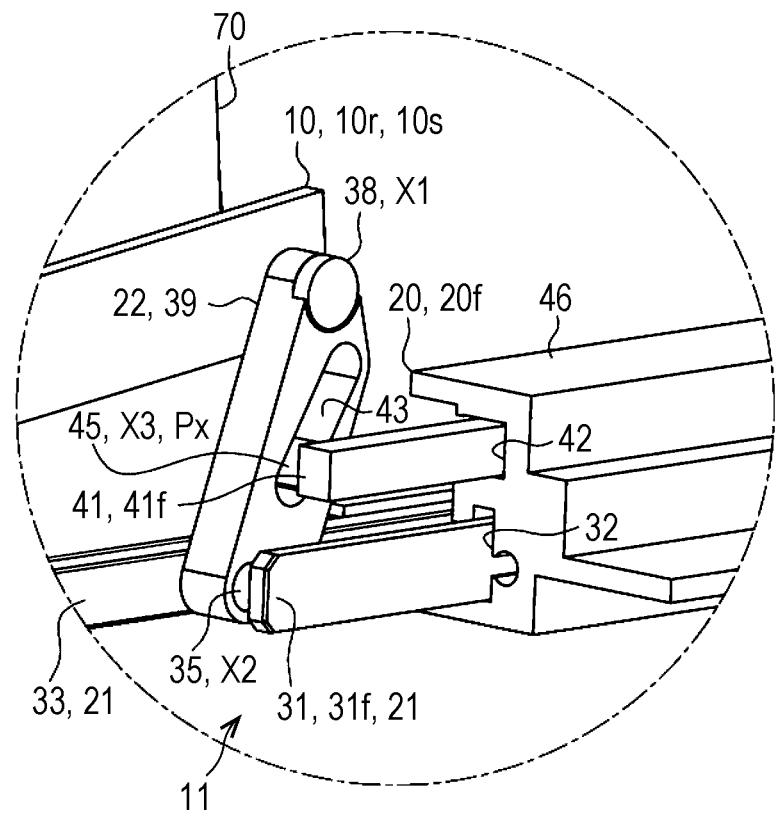
FIG. 9 is a perspective view of the ramp device.
Figure 11:
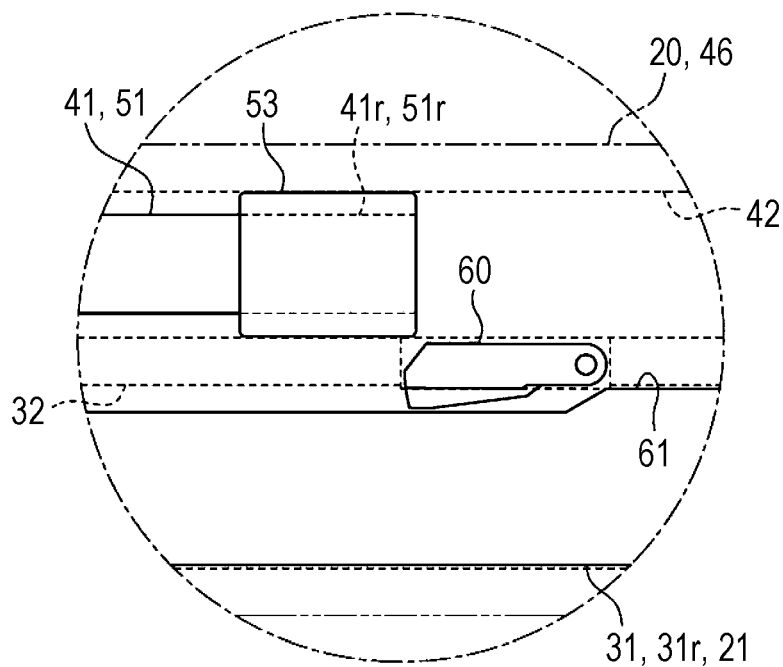
FIG. 11 is an enlarged view of a vicinity of a lever member provided on a guide rail.
Figure 12:
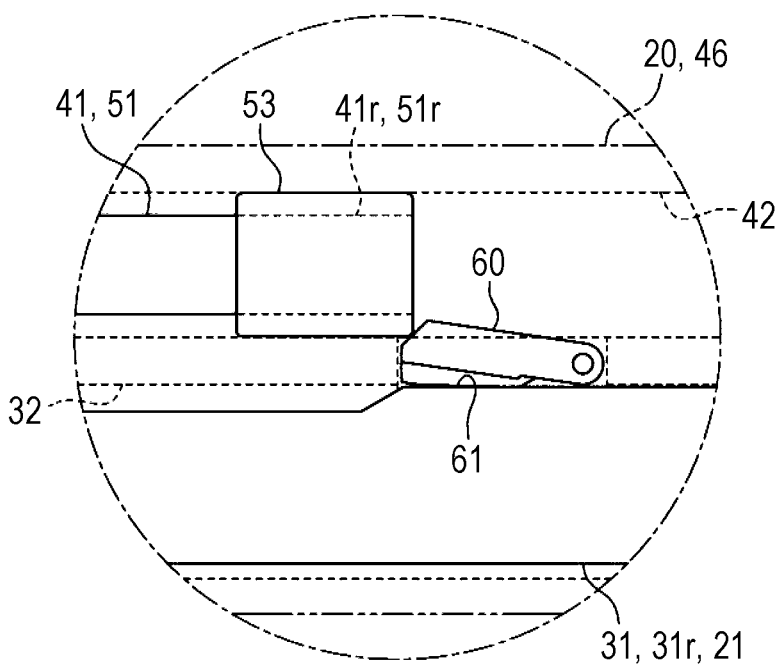
FIG. 12 is an enlarged view of the vicinity of the lever member provided on the guide rail.

Moreover, as illustrated in FIGS. 6 to 8, the ramp device 11 according to the present embodiment includes a sub-shoe 33 that has an outer shape of a substantially elongated bar and is arranged in parallel to the drive shoe 31 to constitute the moving body 21 together with the drive shoe 31, and a shaft-like member 35 extending between the drive shoe 31 and the sub-shoe 33. In the ramp device 11 according to the present embodiment, the shaft-like member 35 is fixed to a front end portion 31f of the drive shoe 31. Further, the support arm 22 of the present embodiment has an outer shape of a substantially elongated flat plate having a connection hole 36, which is a substantially circular hole, at its longitudinal end portion. The ramp device 11 according to the present embodiment is configured such that the shaft-like member 35 is inserted into the connection hole 36 formed in the support arm 22 to rotatably connect the drive shoe 31 and the sub-shoe 33 that constitute the moving body 21 to the support arm 22.

The support arm 22 of the present embodiment has a similar connection hole 37 at a longitudinal end portion opposite to the longitudinal end portion connected to the drive shoe 31. The ramp device 11 according to the present embodiment includes a shaft-like member 38 that is inserted into the connection hole 37 while being supported by a rear end portion 10r of the ramp plate 10. The support arm 22 of the present embodiment is thus configured to be rotatably connected to the rear end portion 10r of the ramp plate 10.

That is, as illustrated in FIGS. 4, 5A, 5B, 9, 10A, and 10B, the support arm 22 of the present embodiment is configured as a link member 39 having a first connection point X1 to the rear end portion 10r of the ramp plate 10 that is deployed to the outside of the vehicle from the storage box 12 with a front end portion 10f being the leading end, and a second connection point X2 to the drive shoe 31. The ramp device 11 according to the present embodiment is configured such that as the support arm 22 rotates to lift up the rear end portion 10r of the ramp plate 10, the ramp plate 10 deployed at the lower end of the door opening 3 is inclined.

More specifically, as illustrated in FIG. 8, the guide rail 20 of the present embodiment includes an arm guide portion 40 extending in the extending direction of the guide rail 20 at a position on a side of the drive guide portion 32 and on a widthwise inside of the ramp plate 10. The ramp device 11 according to the present embodiment is configured such that the sub-shoe 33 and the support arm 22 are disposed within the arm guide portion 40.

Further, as illustrated in FIGS. 4 to 10B, the ramp device 11 according to the present embodiment includes a driven shoe 41 that moves in the extending direction of the guide rail 20 in conjunction with the drive shoe 31. In the ramp device 11 according to the present embodiment, the driven shoe 41 has an outer shape of a substantially elongated rod. Further, the guide rail 20 of the present embodiment includes a driven guide portion 42 extending in the extending direction of the guide rail 20 above the drive guide portion 32. The driven shoe 41 of the present embodiment is disposed within the driven guide portion 42 in a state of extending in the extending direction of the guide rail 20.

As illustrated in FIGS. 6 and 7, the driven shoe 41 of the present embodiment is rotatably connected to the support arm 22 at its front end portion 41f. Specifically, the support arm 22 of the present embodiment has an elongated hole 43 extending in a longitudinal direction of the support arm 22 at a position between the connection hole 37 constituting the first connection point X1 to the rear end portion 10r of the ramp plate 10 and the connection hole 36 constituting the second connection point X2 to the drive shoe 31. Further, the ramp device 11 according to the present embodiment includes a shaft-like member 45 that is inserted into the elongated hole 43 while being supported at the front end portion 41f of the driven shoe 41. In the ramp device 11 according to the present embodiment, the movement of the shaft-like member 45 in the elongated hole 43 allows a relative rotation of the support arm 22 and the driven shoe 41, where the shaft-like member 45 is a third connection point X3 of the support arm 22 and the driven shoe 41.

Figure 5A:
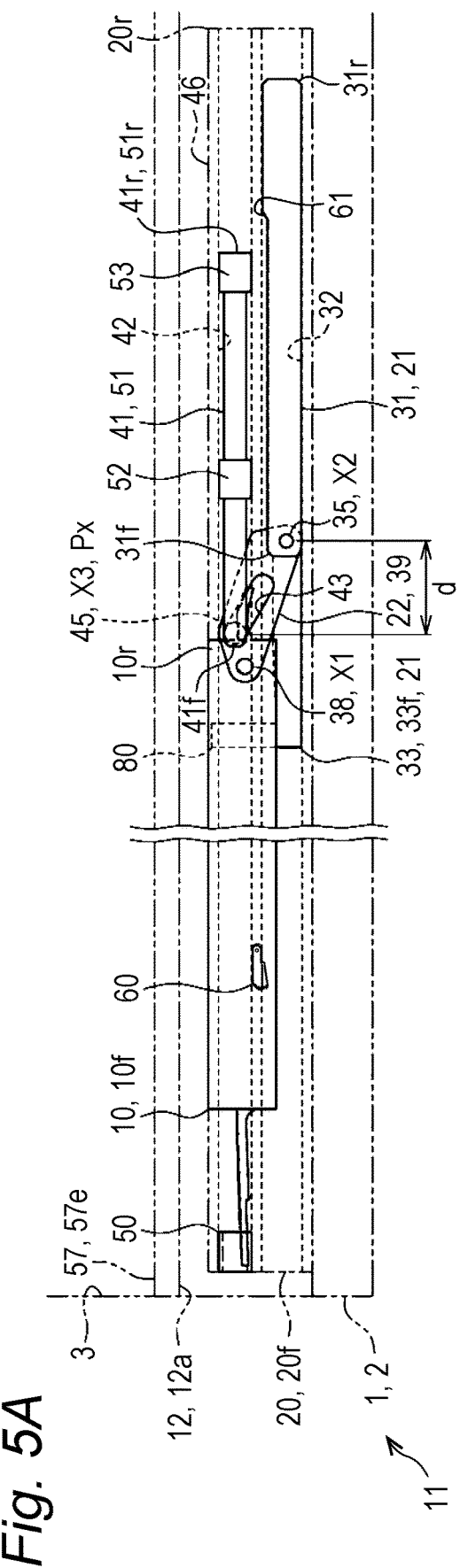
FIGS. 5A and 5B are side views of the ramp device.
Figure 5B:
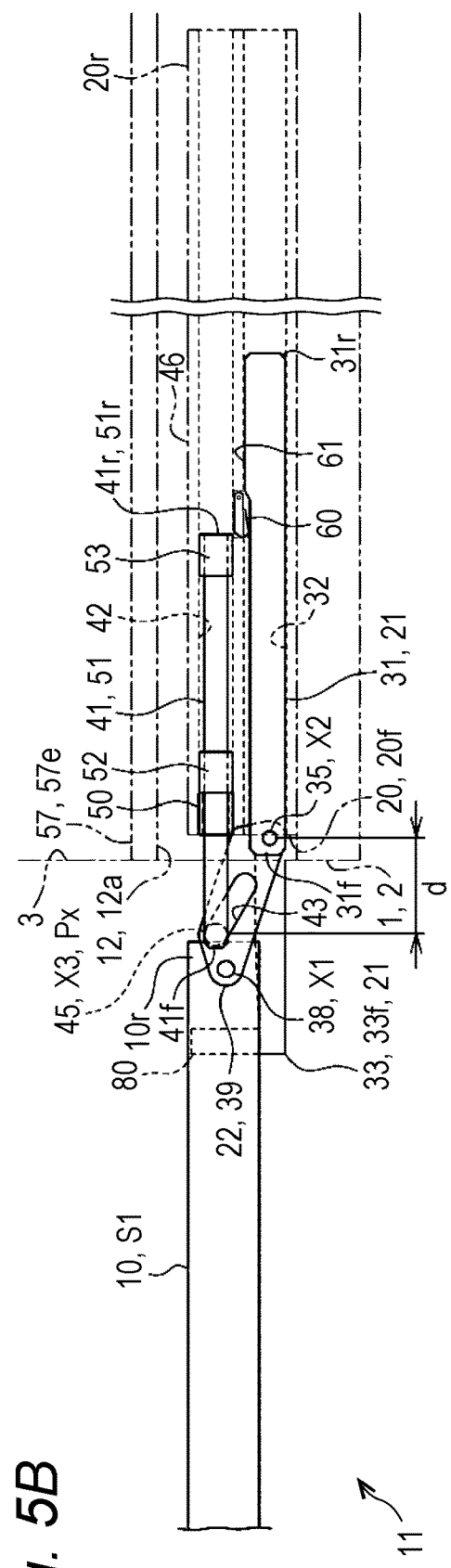

That is, as illustrated in FIGS. 5A and 5B, in the ramp device 11 according to the present embodiment, the ramp plate 10 that is connected to the drive shoe 31 and the sub-shoe 33 via the support arm 22 moves in the extending direction of the guide rail 20 together with the drive shoe 31 and the sub-shoe 33 that function as the moving body 21. At this time, the driven shoe 41 connected to the support arm 22 also moves in the extending direction of the guide rail 20 in conjunction with the drive shoe 31 in a state of being engaged with the guide rail 20. The ramp device 11 according to the present embodiment is thus configured to keep the orientation of the ramp plate 10 that moves in its deploying or retracting direction.

Specifically, as illustrated in FIGS. 5A, 5B, and 8, according to the ramp device 11 of the present embodiment, in a state where the ramp plate 10 is moved in the deploying or retracting direction, the first connection point X1 of the support arm 22 to the ramp plate 10 is located ahead of the second connection point X2 of the support arm 22 to the drive shoe 31, that is, in the deploying direction of the ramp plate 10. At this time, the support arm 22 is in sliding contact with a top plate portion 46 of the guide rail 20 that is disposed above the support arm 22. Further, the shaft-like member 45 that is inserted into the elongated hole 43 formed in the support arm 22 to constitute the third connection point X3 of the support arm 22 to the driven shoe 41 is located near a longitudinal end portion of the elongated hole 43 toward the deploying direction. That is, the rotation of the support arm 22 in a forward inclined orientation in the standing direction is restricted by the top plate portion 46 of the guide rail 20 that is in sliding contact with the support arm 22, and the rotation of the support arm 22 in the bending direction is restricted by the shaft-like member 45 constituting the third connection point X3 of the support arm 22 to the driven shoe 41 being engaged with the longitudinal end portion of the elongated hole 43. The ramp device 11 according to the present embodiment is thus configured such that the orientation of the ramp plate 10 that moves in its deploying or retracting direction together with the moving body 21 and the support arm 22 is kept substantially horizontal.

Moreover, as illustrated in FIGS. 5A, 5B, 10A, and 10B, the ramp device 11 according to the present embodiment includes a stopper portion 50 that abuts against the driven shoe 41 in a state where the ramp plate 10 is deployed at the door opening 3 to allow the rotation of the support arm 22, thus restricting the movement of the driven shoe 41 toward the front end portion 20f of the guide rail 20.

Specifically, as illustrated in FIGS. 5A to 8, 10A, and 10B, the driven shoe 41 of the present embodiment includes a shoe body 51 whose outer shape is a substantially rectangular rod and fitting members 52 and 53 that have a substantially rectangular cylindrical shape and are fitted to an outer periphery of the shoe body 51. In the driven shoe 41 of the present embodiment, these fitting members 52 and 53 are respectively disposed at a substantially intermediate position and a rear end portion 51r in a longitudinal direction of the shoe body 51 extending along the extending direction of the guide rail 20.

Furthermore, as illustrated in FIGS. 5A, 5B, 10A, and 10B, in the ramp device 11 according to the present embodiment, the stopper portion 50 has a substantially rectangular cylindrical shape through which the shoe body 51 of the driven shoe 41 moving toward the front end portion 20f of the guide rail 20 can be inserted. That is, the driven shoe 41 of the present embodiment is configured such that one fitting member 52 located on the front abuts against an axial end surface of the stopper portion 50. The ramp device 11 according to the present embodiment is thus configured to restrict the movement of the driven shoe 41 toward the front end portion 201 of the guide rail 20.

In the ramp device 11 according to the present embodiment, even when the driven shoe 41 abuts against the stopper portion 50 as described above, the movement of the drive shoe 31 and the sub-shoe 33 toward the front end portion 20f of the guide rail 20 is still allowed.

That is, in the ramp device 11 according to the present embodiment, as the shaft-like member 45 formed at the front end portion 41f of the driven shoe 41 apparently moves in the elongated hole 43 of the support arm 22, the movement of the drive shoe 31 is allowed even when the movement of the driven shoe 41 is restricted. At this time, a distance d between the second connection point X2 of the support arm 22 to the drive shoe 31 and the third connection point X3 of the support arm 22 to the driven shoe 41 in the extending direction of the guide rail 20 changes. Further, based on the change in the distance d between the second connection point X2 and the third connection point X3, the support arm 22 rotates with the third connection point X3 to the driven shoe 41 being a rotation fulcrum Px (clockwise direction in FIGS. 10A and 10B). The ramp device 11 according to the present embodiment can thus lift up the rear end portion 10r of the ramp plate 10 that is deployed at the door opening 3 based on the driving force of the actuator 25 that moves the drive shoe 31 in the extending direction of the guide rail 20.

Further, as illustrated in FIGS. 4, 5A, 5B, 9, 10A, and 10B, in the ramp device 11 according to the present embodiment, the ramp plate 10 is deployed at the lower end of the door opening 3 in a state where the shaft-like member 45 that constitutes the third connection point X3 of the support arm 22 to the driven shoe 41 is moved to the front further than the front end portion 20f of the guide rail 20. Moreover, in the ramp device 11 according to the present embodiment, at this time, the shaft-like member 35 that constitutes the second connection point X2 of the support arm 22 to the drive shoe 31 is also moved to the front further than the front end portion 20f of the guide rail 20. The ramp device 11 according to the present embodiment is thus configured such that the rotating support arm 22 and the rear end portion 10r of the ramp plate 10 lifted by the support arm 22 do not interfere with the front end portion 20f of the guide rail 20.

Furthermore, as illustrated in FIGS. 10A and 10B, in the ramp device 11 according to the present embodiment, the rear end portion 10r of the ramp plate 10 includes a floor engaging portion 55 that extends rearward. That is, in the ramp device 11 according to the present embodiment, as the support arm 22 rotates in the direction in which the first connection point X1 to the ramp plate 10 rises, the rear end portion 10r of the ramp plate 10 approaches an edge portion 57e of a vehicle floor 57 that faces the door opening 3. The ramp device 11 according to the present embodiment is thus configured such that the floor engaging portion 55 formed at the rear end portion 10r of the ramp plate 10 engages with the edge portion 57e of the vehicle floor 57, and thus the load of the ramp plate 10 is supported by the vehicle floor 57.

In the ramp device 11 according to the present embodiment, the drive shoe 31 moves toward the front end portion 20f of the guide rail 20 while overtaking the driven shoe 41 having abutted against the stopper portion 50. Further, in the ramp device 11 according to the present embodiment, the second connection point X2 of the support arm 22 to the drive shoe 31 moves toward the front end portion 20f of the guide rail 20 beyond the third connection point X3 to the driven shoe 41 that is the rotation fulcrum Px of the support arm 22. The ramp device 11 according to the present embodiment is thus configured such that the rear end portion 10r of the ramp plate 10 lifted up by the rotation of the support arm 22 is moderately lowered to approach the vehicle floor 57, thus engaging with the edge portion 57e.

In addition, the ramp device 11 according to the present embodiment includes a lever member 60 that engages with the rear end portion 41r of the driven shoe 41, more specifically, the fitting member 53 provided at the rear end portion 51r of the shoe body 51 in a state where the ramp plate 10 is deployed at the lower end of the door opening 3.

Specifically, as illustrated in FIGS. 10A to 12, in the ramp device 11 according to the present embodiment, the lever member 60 is disposed between the drive guide portion 32 and the driven guide portion 42 that are vertically arranged. Further, the lever member 60 is axially supported so as to be rotatable around the guide rail 20 in a state of extending in the extending direction of the guide rail 20. The rear end portion 31r of the drive shoe 31 extending in the extending direction of the guide rail 20 includes a cam surface 61 that is in sliding contact with the lever member 60 when the drive shoe 31 moves to a vicinity of the front end portion 20f of the guide rail 20. The lever member 60 of the present embodiment is thus configured to be pressed against the cam surface 61 and rotate, thus engaging with the fitting member 53 provided at the rear end portion 41r of the driven shoe 41 from a side of the rear end portion 20r of the guide rail 20.

Moreover, as illustrated in FIGS. 10A and 10B, in the ramp device 11 according to the present embodiment, the engagement of the lever member 60 restricts the movement of the driven shoe 41 toward the rear end portion 20r of the guide rail 20. That is, in the ramp device 11 according to the present embodiment, when the ramp plate 10 is in a deployed state, the lever member 60 and the stopper portion 50 keeps the position of the shaft-like member 45 that constitutes the third connection point X3 of the support arm 22 to the driven shoe 41, that is, the rotation fulcrum Px of the support arm 22 in the extending direction of the guide rail 20. As a result, the ramp device 11 according to the present embodiment can more directly convert the movement of the drive shoe 31 along the extending direction of the guide rail 20 into the rotation of the support arm 22.

That is, in the ramp device 11 according to the present embodiment, even when the drive shoe 31 moves toward the rear end portion 20r of the guide rail 20 in this state, the distance d between the second connection point X2 of the support arm 22 to the drive shoe 31 and the third connection point X3 of the support arm 22 to the driven shoe 41 in the extending direction of the guide rail 20 also changes. Further, based on the change in the distance d between the second connection point X2 and the third connection point X3, that is, between the second connection point X2 and the rotation fulcrum Px, the support arm 22 rotates in the opposite direction to the direction when the drive shoe 31 moves toward the front end portion 20f of the guide rail 20 (counterclockwise direction in FIGS. 10A and 10B). The ramp device 11 according to the present embodiment can thus lower the rear end portion 10r of the ramp plate 10, which has been lifted up, based on the driving force of the actuator 25.

Further, as illustrated in FIGS. 5A, 5B, 11 and 12, in the ramp device 11 according to the present embodiment, the drive shoe 31 moves toward the rear end portion 20r of the guide rail 20 subsequent to the lowering operation of the ramp plate 10, so that the cam surface 61 formed at the rear end portion 31r of the drive shoe 31 is disengaged from the lever member 60. As the lever member 60 rotates accordingly, the lever member 60 is disengaged from the fitting member 53 provided at the rear end portion 41r of the driven shoe 41. The ramp device 11 according to the present embodiment is configured such that as the support arm 22 and the driven shoe 41 move together with the drive shoe 31, the ramp plate 10 connected to the support arm 22 moves toward the rear end portion 20r of the guide rail 20, which is the retracting direction, while maintaining the substantially horizontal orientation.

(Fall Prevention Member)

Next, a configuration of a fall prevention member formed on a side end portion of the ramp plate 10 will be described.

Figure 13:
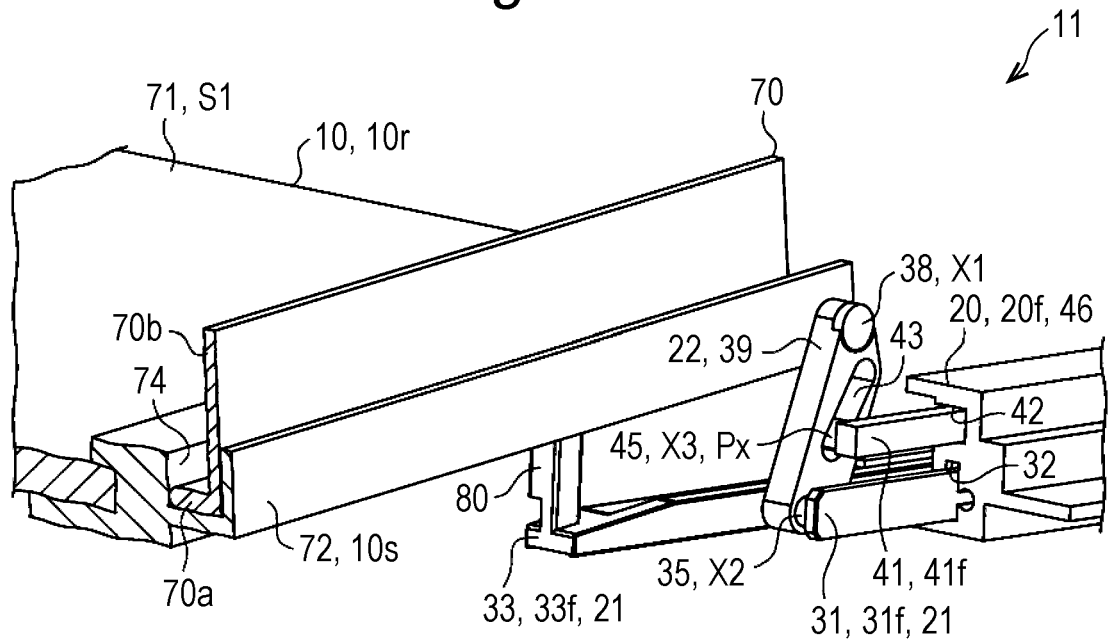
FIG. 13 is a perspective view of the ramp device.
Figure 14:
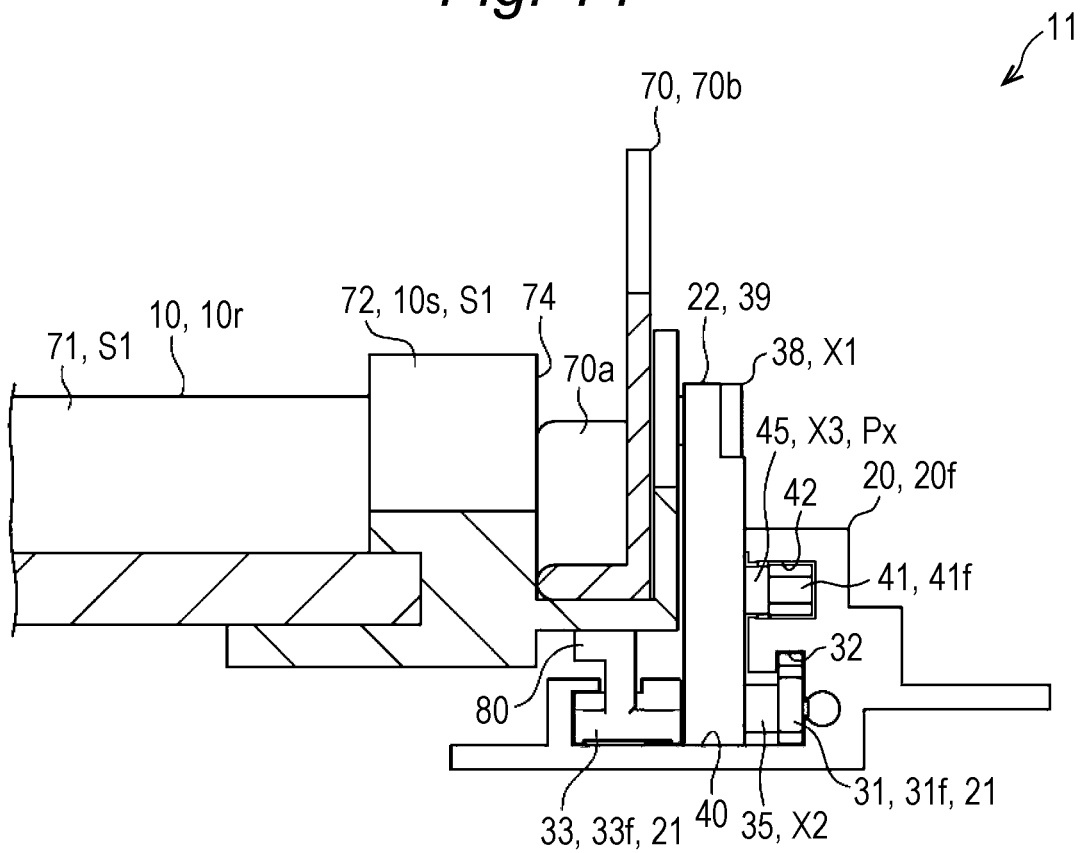
FIG. 14 is a front view of the ramp device.
Figure 15:
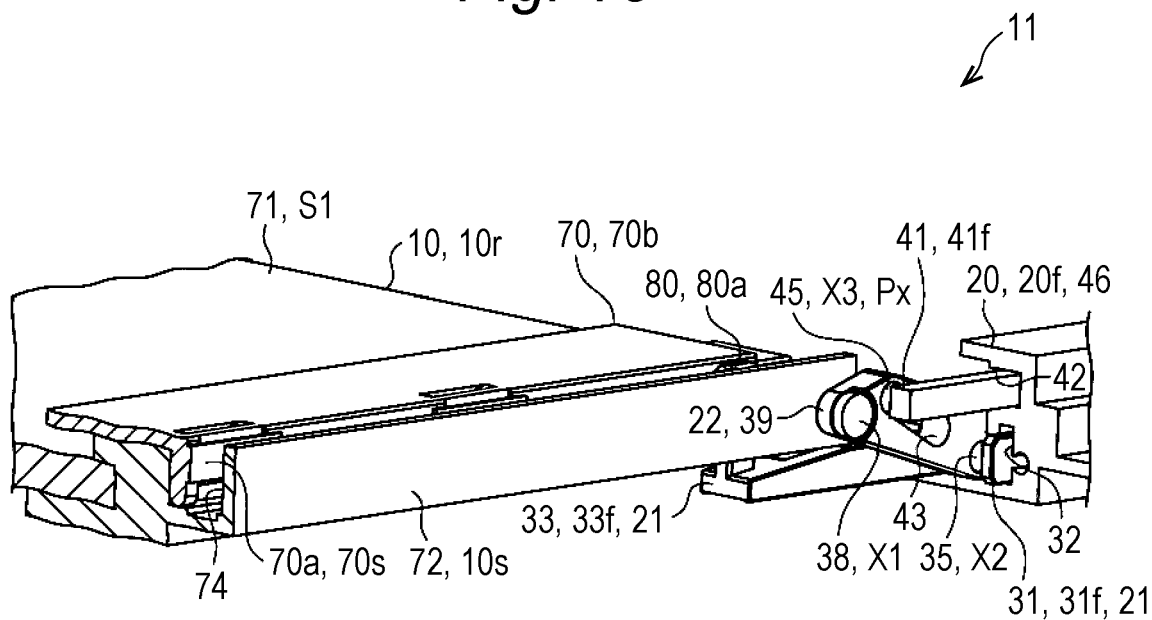
FIG. 15 is a perspective view of the ramp device.
Figure 16:
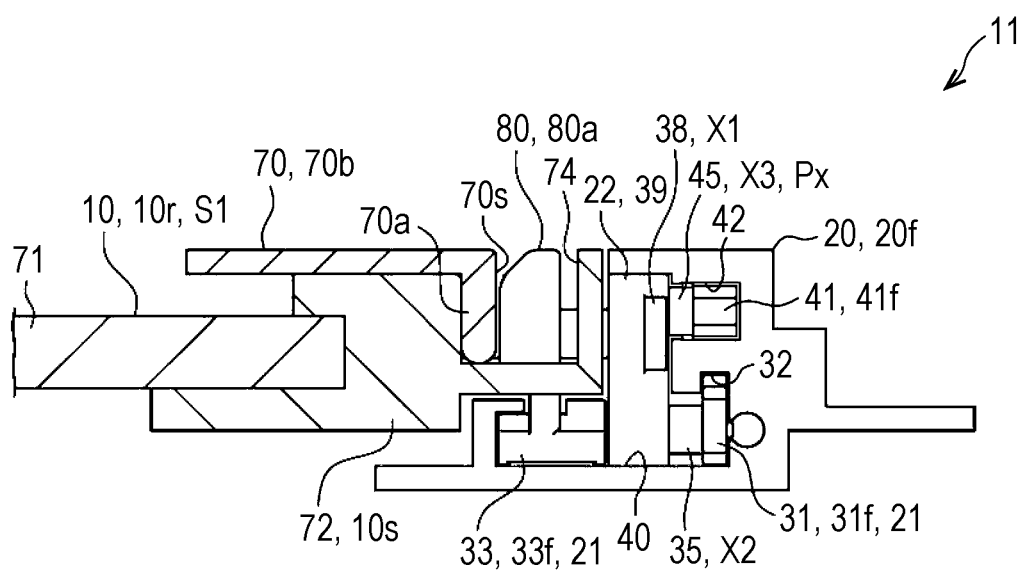
FIG. 16 is a front view of the ramp device.

As illustrated in FIGS. 13 and 14, the ramp device 11 according to the present embodiment includes a fall prevention member 70 formed on a side end portion 10s of the ramp plate 10. Specifically, the ramp plate 10 of the present embodiment includes a ramp body 71 having a substantially flat plate shape and a ramp guide 72 that is fitted into a widthwise end portion of the ramp body 71 to constitute the side end portion 10s of the ramp plate 10. The fall prevention member 70 of the present embodiment is formed in the ramp guide 72 in a state of extending in a front-rear direction of the ramp plate 10. The ramp device 11 according to the present embodiment is thus configured such that an object moving on the ramp plate 10 deployed at the lower end of the door opening 3 is unlikely to fall from the ramp plate 10.

More specifically, as illustrated in FIGS. 13 to 16, the fall prevention member 70 of the present embodiment is rotatably connected to the ramp guide 72.

Figure 17:
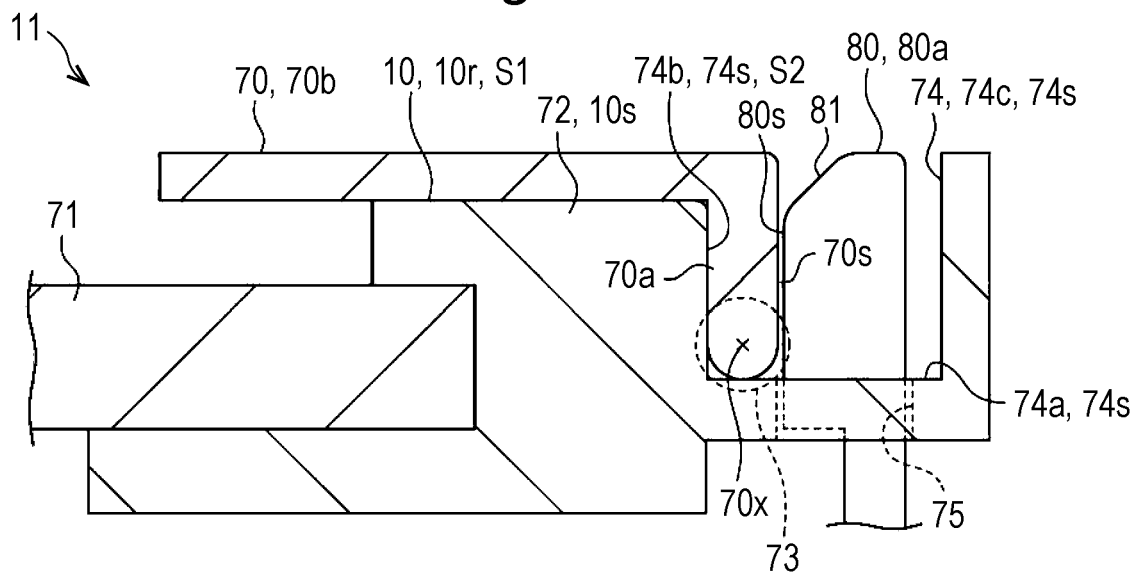
FIG. 17 is a cross-sectional view of the ramp device in a state where a fall prevention member is bent.
Figure 18:
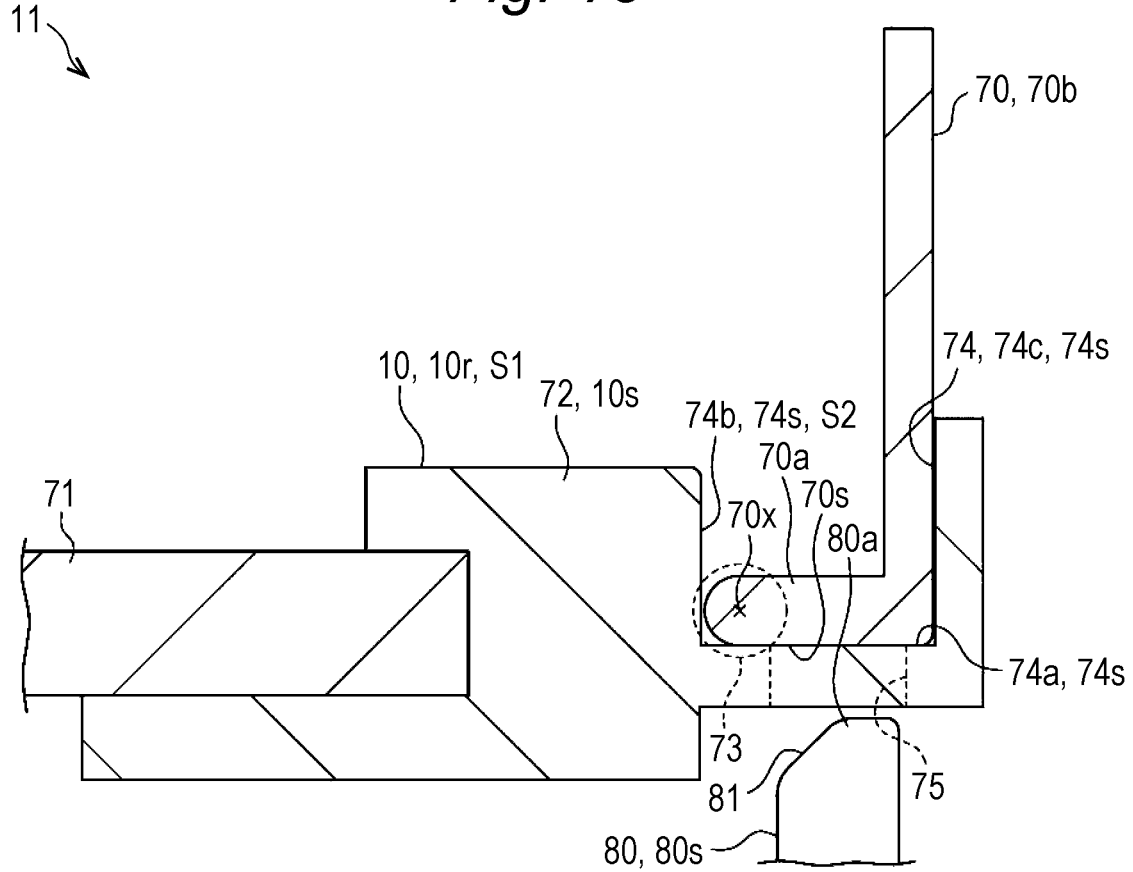
FIG. 18 is a cross-sectional view of the ramp device in a state where the fall prevention member is standing.
Figure 19:
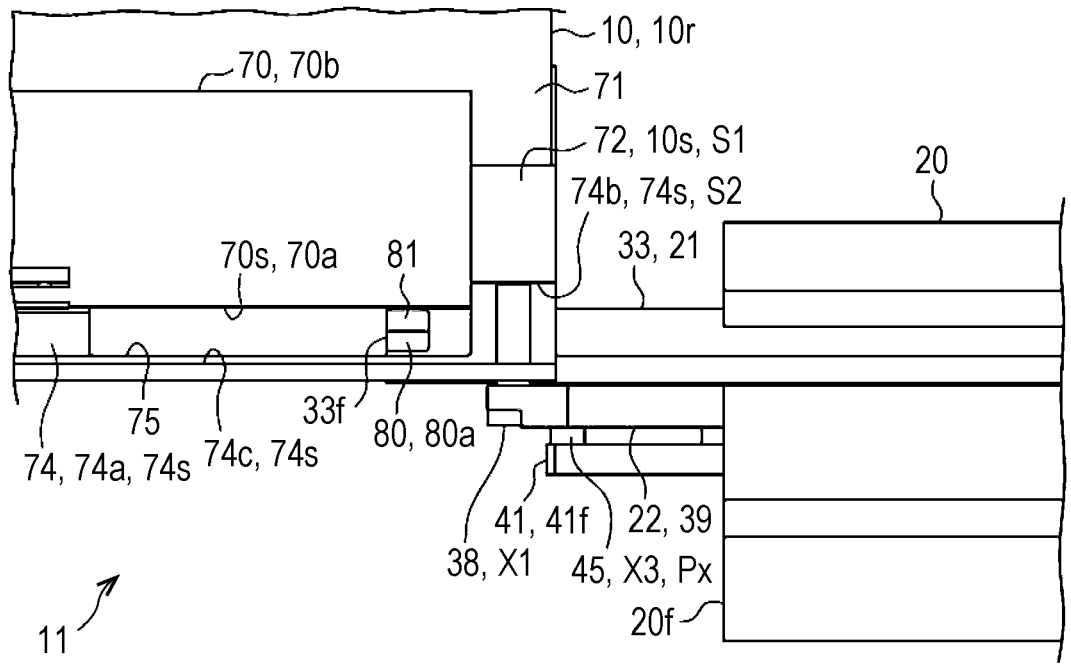
FIG. 19 is a plan view of the ramp device illustrating a groove portion and a hole portion formed in a ramp plate.
Figure 20:
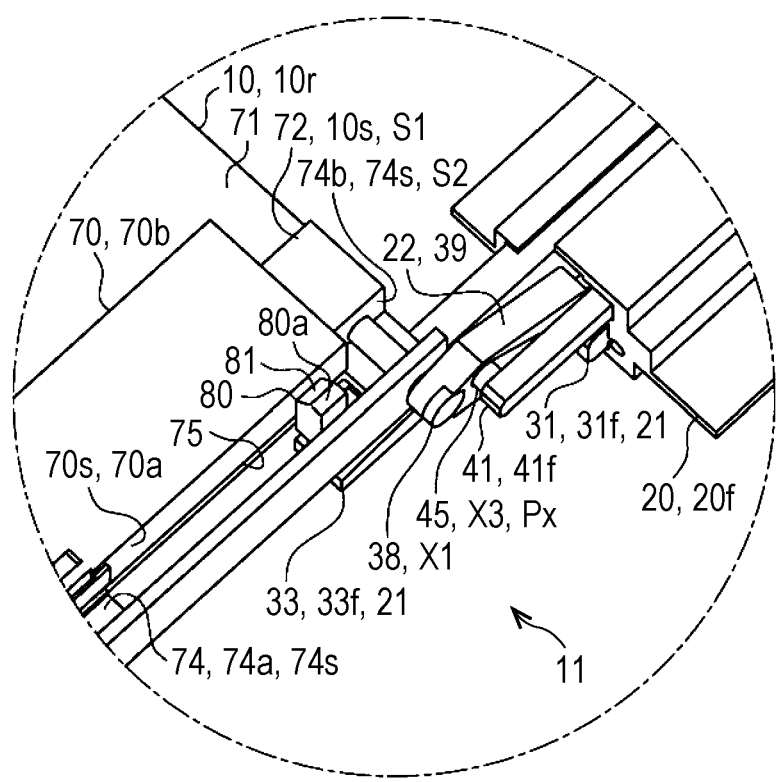
FIG. 20 is a perspective view of the ramp device illustrating the groove portion and the hole portion formed in the ramp plate.
Figure 21:
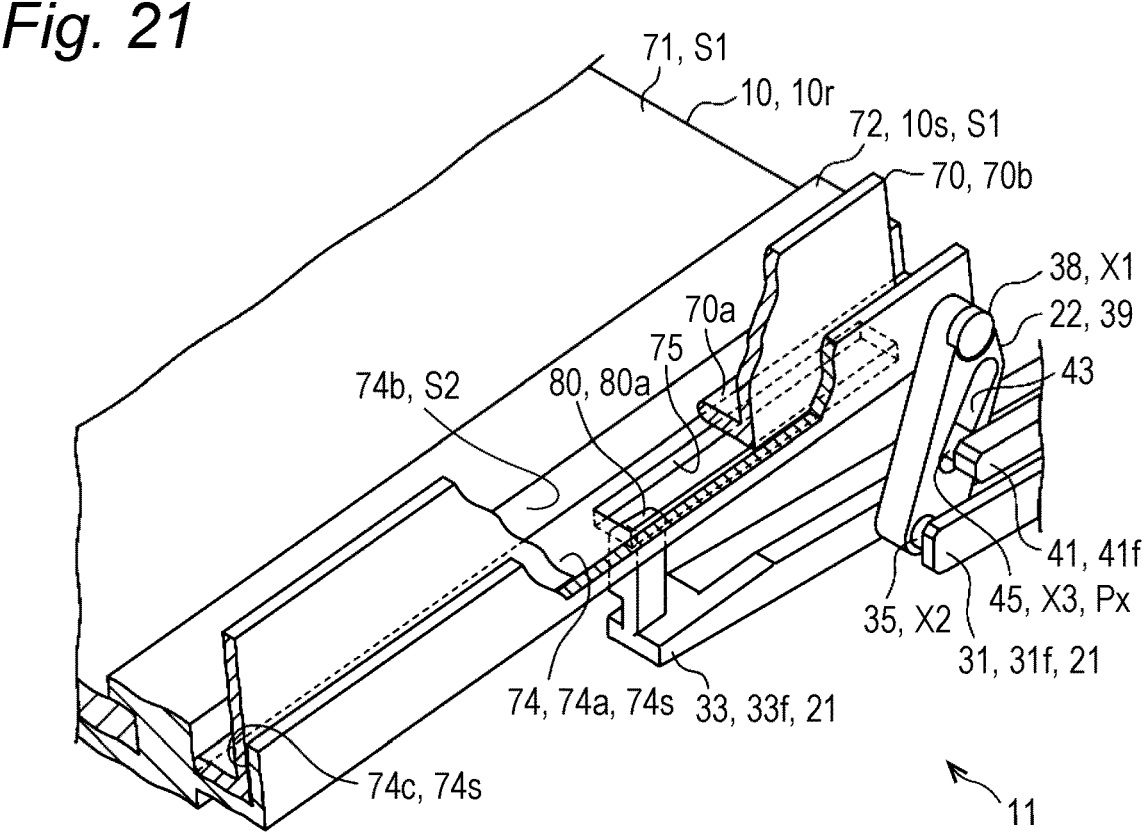
FIG. 21 is a perspective view of the ramp device illustrating a relationship between the fall prevention member and a pressing member.

Specifically, as illustrated in FIGS. 17 and 18, the fall prevention member 70 of the present embodiment has a rotation axis 70x extending in a longitudinal direction of the fall prevention member 70 (direction orthogonal to surface in each drawing). The ramp device 11 according to the present embodiment also includes an urging member 73 that urges the fall prevention member 70 to rotate the fall prevention member 70 around the rotation axis 70x. For example, a torsion spring such as a torsion coil spring can be used as the urging member 73. The ramp device 11 according to the present embodiment is configured such that the fall prevention member 70 stands on the side end portion 10s of the ramp plate 10 so as to project upward from a top surface S1 of the ramp plate 10.

More specifically, as illustrated in FIGS. 13 to 18, the fall prevention member 70 of the present embodiment has a substantially L-shaped cross-section. The fall prevention member 70 has the rotation axis 70x at a distal end portion of the substantially L-shaped cross-section. The ramp guide 72 of the present embodiment has a groove portion 74 that opens to a side of the top surface S1 of the ramp plate 10 and extends in a longitudinal direction of the ramp guide 72. The ramp device 11 according to the present embodiment is configured to house the fall prevention member 70, which is standing, in the groove portion 74.

Specifically, as illustrated in FIGS. 17 and 18, the fall prevention member 70 of the present embodiment is rotatably connected to the ramp guide 72 that constitutes the side end portion 10s of the ramp plate 10 near a bottom surface 74a and one side wall surface 74b of the groove portion 74. Further, as the fall prevention member 70 rotates based on the urging force of the urging member 73 (rotates in clockwise direction in FIGS. 17 and 18), a first flat plate portion 70a having the rotation axis 70x abuts against the bottom surface 74a of the groove portion 74, and a second flat plate portion 70b orthogonal to the first flat plate portion 70a abuts against the other side wall surface 74c. The ramp device 11 according to the present embodiment is thus configured such that the fall prevention member 70 standing in the groove portion 74 is supported by an inner wall surface 74s of the groove portion 74.

As illustrated in FIGS. 17 to 20, in the ramp device 11 according to the present embodiment, the ramp guide 72 has a hole portion 75 formed in the bottom surface 74a of the groove portion 74. The ramp device 11 according to the present embodiment also includes a pressing member 80 that is inserted from below the ramp plate 10 into the hole portion 75 formed so as to penetrate the side end portion 10s of the ramp plate 10 in a thickness direction. In the ramp device 11 according to the present embodiment, the pressing member 80 presses the fall prevention member 70 in the groove portion 74, and thus the fall prevention member 70 can be bent on the top surface S1 of the ramp plate 10 against the urging force of the urging member 73.

More specifically, as illustrated in FIGS. 6 and 7, in the ramp device 11 according to the present embodiment, the sub-shoe 33 constituting the moving body 21 together with the drive shoe 31 supports the shaft-like member 35 functioning as the second connection point X2 of the support arm 22 to the drive shoe 31 at an intermediate position in the longitudinal direction of a substantially elongated rod shape extending along the extending direction of the guide rail 20. The ramp device 11 according to the present embodiment has the pressing member 80 at the front end portion 33f of the sub-shoe 33.

That is, as illustrated in FIGS. 5A, 5B, 10A, and 10B, in the ramp device 11 according to the present embodiment, when the ramp plate 10 is in a deployed state, the front end portion 33f of the sub-shoe 33 is also moved to the front further than the front end portion 20f of the guide rail 20. Further, at the position where the front end portion 33f of the sub-shoe 33 is located, the rear end portion 10r of the ramp plate 10 connected to the moving body 21 via the support arm 22 is moved up and down based on the rotation of the support arm 22. The ramp device 11 according to the present embodiment is thus configured such that the pressing member 80 formed at the front end portion 33f of the sub-shoe 33 abuts against the fall prevention member 70 that moves downward together with the ramp plate 10 through the hole portion 75 formed in the side end portion 10s of the ramp plate 10, and presses the fall prevention member 70.

More specifically, as illustrated in FIGS. 5A, 5B, 7, 10A, and 10B, the pressing member 80 of the present embodiment has an outer shape of a substantially rod extending upward, and is vertically disposed at the front end portion 33f of the sub-shoe 33.

Further, as illustrated in FIGS. 10A, 10B, 18, and 21, in the ramp device 11 according to the present embodiment, when the support arm 22 rotates due to the movement of the drive shoe 31 toward the front end portion 20f of the guide rail 20, the rear end portion 10r of the ramp plate 10, which has been lifted up, is located above a distal end portion 80a of the pressing member 80. In the ramp device 11 according to the present embodiment, when the ramp plate 10 is in a lifted state, the fall prevention member 70 formed on the side end portion 10s is made to stand based on the urging force of the urging member 73.

Further, as illustrated in FIGS. 5A, 5B, 17, and 22, the ramp device 11 according to the present embodiment is configured such that when the support arm 22 rotates due to the movement of the drive shoe 31 toward the rear end portion 20r of the guide rail 20 and thus the rear end portion 10r of the ramp plate 10 is lowered, the pressing member 80 is inserted from below into the hole portion 75 formed in the side end portion 10s.

As illustrated in FIGS. 19 to 22, in the ramp device 11 according to the present embodiment, the hole portion 75 has an elongated hole shape that extends in the front-rear direction in response to the back-and-forth movement of the ramp plate 10 according to the rotation of the support arm 22. Further, the pressing member 80 inserted into the groove portion 74 of the ramp plate 10 through the hole portion 75 presses the fall prevention member 70 standing in the groove portion 74 by using the first flat plate portion 70a that abuts against the bottom surface 74a of the groove portion 74 as an abutment surface 70s. The ramp device 11 according to the present embodiment is configured such that the fall prevention member 70 rotates against the urging force of the urging member 73 to be bent on the top surface S1 of the ramp plate 10.

Figure 22:
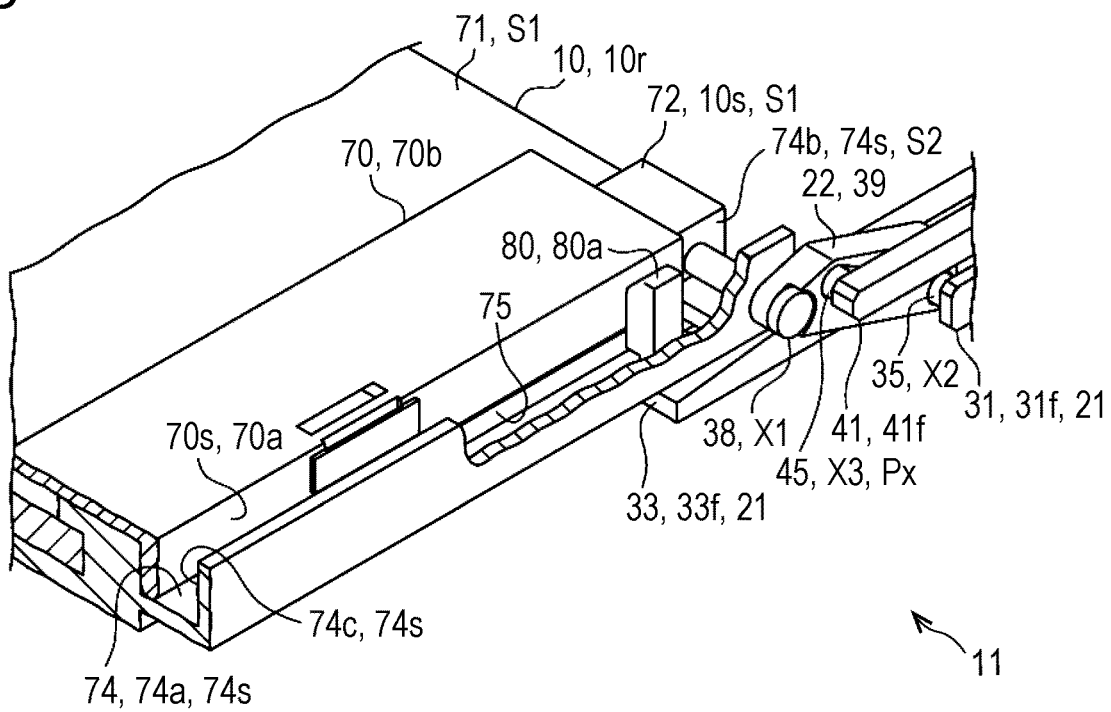
FIG. 22 is a perspective view of the ramp device illustrating a relationship between the fall prevention member and the pressing member.

Specifically, as illustrated in FIGS. 17 and 22, the fall prevention member 70 of the present embodiment is bent so that the first flat plate portion 70a is along the side wall surface 74b of the groove portion 74 constituting the side end surface S2 of the ramp plate 10 and the second flat plate portion 70b is along the top surface S1 of the ramp plate 10.

That is, as illustrated in FIGS. 17 and 18, the fall prevention member 70 of the present embodiment is configured such that the abutment surface 70s against the pressing member 80 set on the first flat plate portion 70a faces the bottom of the ramp plate 10 when the fall prevention member 70 stands, and faces the side of the ramp plate 10 when the fall prevention member 70 is bent. Further, the pressing member 80 of the present embodiment is configured such that when the fall prevention member 70 is in a bent state, a side surface 80s extending in the vertical direction abuts against the abutment surface 70s of the fall prevention member 70 that faces the side of the ramp plate 10. In the ramp device 11 according to the present embodiment, by restricting the rotation of the fall prevention member 70 based on the urging force of the urging member 73, the ramp plate 10 can be moved in the retracting direction, and the retracted ramp plate 10 can be moved in the deploying direction, in a state where the fall prevention member 70 is integrated with the ramp plate 10.

Further, the pressing member 80 of the present embodiment has a curved surface 81 that wraps around the side surface 80s from the distal end portion 80a and abuts against the fall prevention member 70. The ramp device 11 according to the present embodiment can thus shift from a state where the distal end portion 80a of the pressing member 80 presses the fall prevention member 70 to bend the fall prevention member 70 to a state where the side surface 80s of the pressing member 80 abuts against the fall prevention member 70 to hold the bent fall prevention member 70.

Next, an operation of the present embodiment will be described.

According to the ramp device 11 of the present embodiment, in a state where the ramp plate 10 is deployed at the lower end of the door opening 3, when the rear end portion 10r of the ramp plate 10 is lowered, the pressing member 80 is inserted from below into the hole portion 75 formed in the side end portion 10s. Further, the pressing member 80 abuts against the fall prevention member 70 that moves downward together with the ramp plate 10 and presses the fall prevention member 70. As a result, the fall prevention member 70 is bent on the top surface S1 of the ramp plate 10 against the urging force of the urging member 73 that urges the fall prevention member 70 in the standing direction.

Next, the effects of the present embodiment will be described.

(1) The ramp device 11 includes the ramp plate 10 that is deployed at the lower end of the door opening 3 and the moving body 21 that moves in the deploying or retracting direction of the ramp plate 10. The ramp device 11 also includes the support arm 22 that is rotatably connected to the ramp plate 10 and is rotatably connected to the moving body 21 to allow a rear end portion 10r of the ramp plate 10 to be lifted up in a state where the ramp plate 10 is deployed. The ramp device 11 also includes the fall prevention member 70 that is rotatably connected to the ramp plate 10 and the urging member 73 that urges the fall prevention member 70 to make the fall prevention member 70 stand on the side end portion 10s of the ramp plate 10. The ramp device 11 also includes the pressing member 80 that abuts against the fall prevention member 70 that moves downward together with the ramp plate 10 having been lifted up based on the rotation of the support arm 22 and presses the fall prevention member 70 to bend the fall prevention member 70 on the top surface S1 of the ramp plate 10 against the urging force of the urging member 73.

With the above configuration, it is possible to bend the fall prevention member 70 standing on the side end portion 10s of the ramp plate 10 by using an operation in which the rear end portion 10r of the ramp plate 10, which has been lifted up, is moved downward by the rotation of the support arm 22. That is, the force to bend the fall prevention member 70 does not affect the driving force required to move the ramp plate 10 in the deploying or retracting direction together with the moving body 21 and the support arm 22. As a result, the ramp plate 10 can be moved in the deploying or retracting direction more smoothly.

Further, as the pressing member 80 abuts against the fall prevention member 70 that moves downward together with the ramp plate 10, the own weight of the ramp plate 10 can be used. The fall prevention member 70 can thus be easily bent.

There is no cam surface that is in sliding contact with the fall prevention member 70 and bends the fall prevention member 70 when the ramp plate 10 of the conventional technique moves in the deploying or retracting direction, and thus the fall prevention member 70 hardly wears and sliding noise hardly occurs. As a result, not only durability and quietness can be improved, but also high texture can be achieved. In addition, it is possible to avoid an increase in external dimensions due to a sliding contact member that forms the cam surface.

(2) The fall prevention member 70 has the abutment surface 70s against the pressing member 80, the abutment surface 70s is configured to face the bottom of the ramp plate 10 when the fall prevention member 70 stands and to face the side of the ramp plate 10 when the fall prevention member 70 is bent.

With the above configuration, the pressing member 80 located below the abutment surface 70s can efficiently press the fall prevention member 70 that moves downward together with the ramp plate 10 having been lifted up. After the fall prevention member 70 is bent, the pressing member 80 can efficiently keep the fall prevention member 70 in a bent state by being located on the side of the abutment surface 70s.

(3) The fall prevention member 70 includes the first flat plate portion 70a having the abutment surface 70s against the pressing member 80 and the second flat plate portion 70b extending orthogonal to the first flat plate portion 70a. Consequently, it is possible to form the fall prevention member 70 that has the abutment surface 70s facing downward in a standing state and facing sideways in a bent state and that is bent on the top surface S1 of the ramp plate 10.

(4) The fall prevention member 70 is bent with the first flat plate portion 70a along the side end surface S2 of the ramp plate 10 and the second flat plate portion 70b along the top surface S1 of the ramp plate 10. As a result, it is possible to enhance the integrity of the fall prevention member 70 bent on the top surface 51 of the ramp plate 10 and the ramp plate 10.

(5) The pressing member 80 has the curved surface 81 that wraps around the side surface 80s from the distal end portion 80a projecting upward, and abuts against the fall prevention member 70.

With the above configuration, it is possible to smoothly shift from a state where the distal end portion 80a of the pressing member 80 presses the fall prevention member 70 to bend the fall prevention member 70 to a state where the side surface 80s of the pressing member 80 abuts against the fall prevention member 70 to hold the bent fall prevention member 70.

(6) The ramp plate 10 has the hole portion 75 that penetrates the side end portion 10s of the ramp plate 10 in a thickness direction. The pressing member 80 then abuts against the fall prevention member 70 through the hole portion 75.

With the above configuration, it is possible to prevent the fall prevention member 70 connected to the ramp plate 10 from projecting to the widthwise outside of the ramp plate 10. As a result, it is possible to avoid the increase in external dimensions.

(7) The top surface S1 of the ramp plate 10 includes the groove portion 74 that houses the fall prevention member 70 standing on the side end portion 10s. The hole portion 75 is formed in the bottom surface 74a of the groove portion 74.

With the above configuration, it is possible to enhance the integrity of the fall prevention member 70 standing on the side end portion 10s and the ramp plate 10. Further, as the hole portion 75 is formed in the groove portion 74, the hole portion 75 does not stand out. Consequently, high designability can be achieved.

(8) The fall prevention member 70, which is standing, is supported by the inner wall surface 74s of the groove portion 74. As a result, the stability of the fall prevention member 70 standing on the side end portion 10s of the ramp plate 10 can be improved.

(9) The pressing member 80 moves together with the moving body 21.

With the above configuration, the pressing member 80 moves in the deploying direction of the ramp plate 10 together with the ramp plate 10 connected to the moving body 21. As a result, the pressing member 80 can be appropriately located at a position where the pressing member 80 can abut against the fall prevention member 70 that moves downward together with the ramp plate 10 when the ramp plate 10 is in a deployed state.

Further, as the pressing member 80 moves in the retracting direction of the ramp plate 10 together with the ramp plate 10, the state where the pressing member 80 abuts against the bent fall prevention member 70 can be kept. As a result, the ramp plate 10 can be moved in the deploying or retracting direction more stably while being integrated with the fall prevention member 70.

The above embodiment can be modified and implemented as follows. The above embodiment and the following modifications can be implemented in combination with each other within a technically consistent range.

In the above embodiment, the top surface S1 of the ramp plate 10 includes the groove portion 74 that houses the standing fall prevention member 70. Further, the hole portion 75 that penetrates the ramp plate 10 in the thickness direction is formed in the bottom surface 74a of the groove portion 74. The pressing member 80 then abuts against the fall prevention member 70 disposed in the groove portion 74 through the hole portion 75.

However, the present disclosure is not limited thereto, and the groove portion 74 that houses the fall prevention member 70 standing on the side end portion 10s of the ramp plate 10 does not need to be formed. Further, the hole portion 75 also does not need to be formed, and it may be configured such that the pressing member 80 disposed on the widthwise outside of the ramp plate 10 abuts against the fall prevention member 70 projecting to the widthwise outside of the ramp plate 10 and presses the fall prevention member 70. In this case, it is preferable to provide a support member that supports the standing fall prevention member 70 on the side end portion 10s of the ramp plate 10.

In the above embodiment, for example, a torsion spring such as a torsion coil spring is exemplified as the urging member 73 of the fall prevention member 70. However, the present disclosure is not limited thereto, and if it is possible to urge the fall prevention member 70 to make the fall prevention member 70 stand on the side end portion 10s of the ramp plate 10, for example, the configuration of the urging member 73 such as a tension spring or a compression spring may be changed as appropriate.

In the above embodiment, the fall prevention member 70 has a substantially L-shaped cross-section that includes the first flat plate portion 70a having the abutment surface 70s against the pressing member 80 and the second flat plate portion 70b extending orthogonal to the first flat plate portion 70a. However, the present disclosure is not limited thereto, and the shape of the fall prevention member 70 may be changed as appropriate. For example, the first flat plate portion 70a and the second flat plate portion 70b do not need to be orthogonal to each other, and may extend so as to intersect each other.

Figure 23:
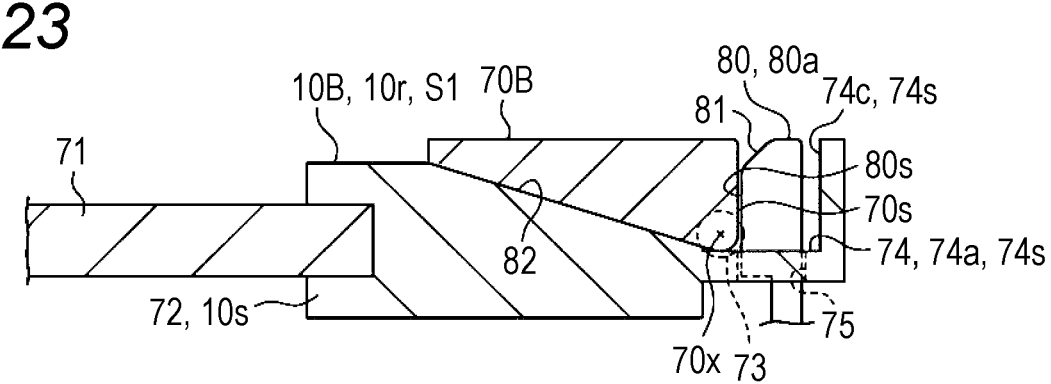
FIG. 23 is a cross-sectional view of the ramp device illustrating a fall prevention member of another example.
Figure 24:
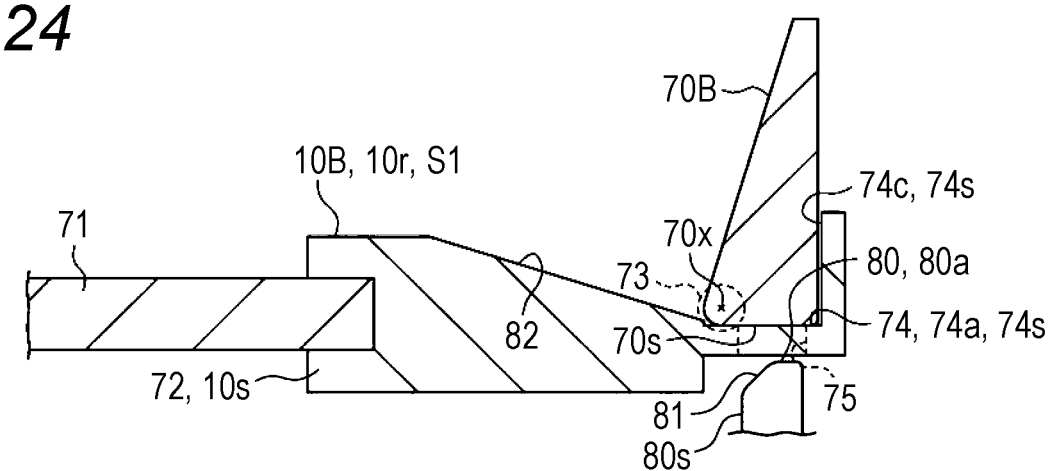
FIG. 24 is a cross-sectional view of the ramp device illustrating the fall prevention member of another example.

The fall prevention member 70 may have a substantially triangular cross-section like a fall prevention member 70B illustrated in FIGS. 23 and 24. In this case, it is preferable to form an inclined surface 82 on the side end portion 10s of a ramp plate 10B according to the cross-sectional shape of the fall prevention member 70B. As a result, it is possible to enhance the integrity of the fall prevention member 70B bent on the top surface S1 and the ramp plate 10B.

Figure 25:
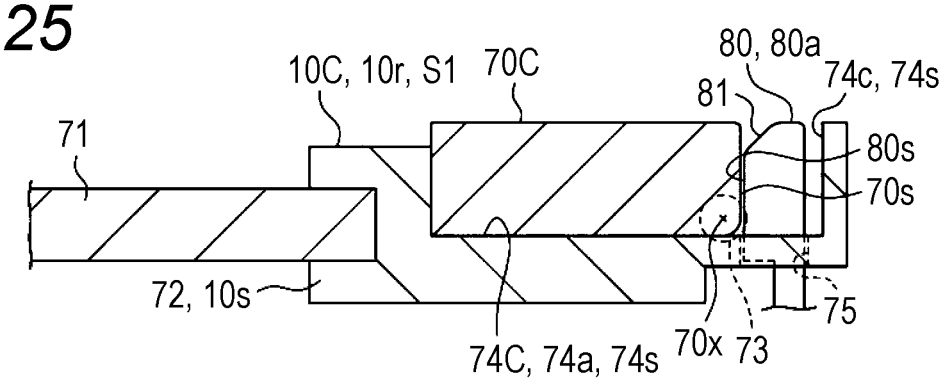
FIG. 25 is a cross-sectional view of the ramp device illustrating a fall prevention member of still another example.
Figure 26:
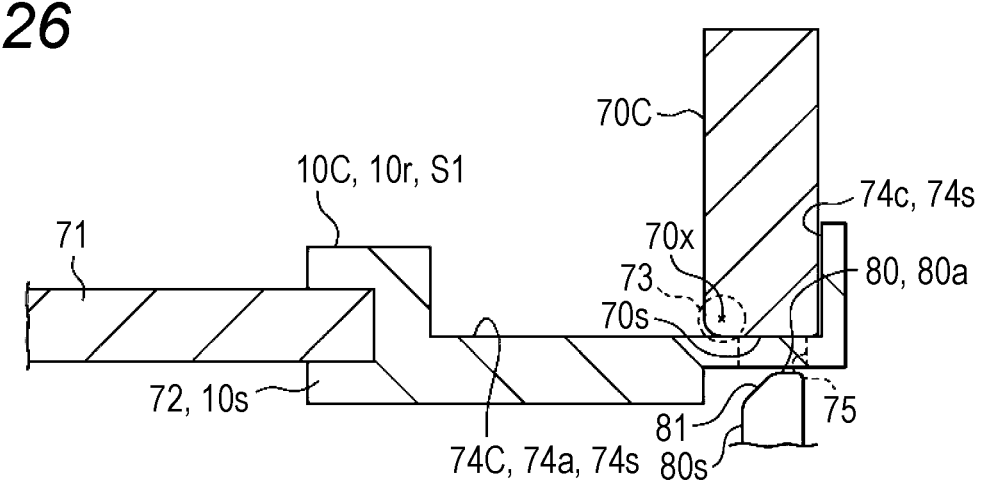
FIG. 26 is a cross-sectional view of the ramp device illustrating the fall prevention member of still another example.

The fall prevention member 70 may have a thick flat plate shape like a fall prevention member 70C illustrated in FIGS. 25 and 26. In this case, it is preferable to form a groove portion 74C on the side end portion 10s of the ramp plate 10C according to the cross-sectional shape of the fall prevention member 70C. Even if such a configuration is adopted, it is possible to set the abutment surface 70s that faces downward in the standing state and facing sideways in the bent state.

In the above embodiment, the fall prevention member 70 has the rotation axis 70x at the distal end portion of the substantially L-shaped cross-section. The fall prevention member 70 is rotatably connected to the side end portion 10s of the ramp plate 10 near the bottom surface 74a and one side wall surface 74b of the groove portion 74. Further, the fall prevention member 70 stands in a state where the first flat plate portion 70a having the rotation axis 70x abuts against the bottom surface 74a of the groove portion 74, and the second flat plate portion 70b orthogonal to the first flat plate portion 70a abuts against the other side wall surface 74c.

Figure 27:
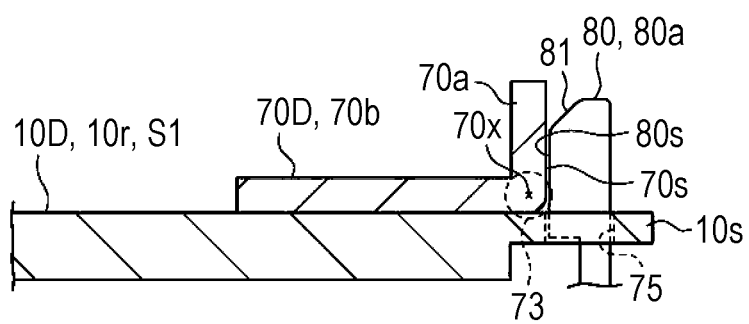
FIG. 27 is a cross-sectional view of the ramp device illustrating a fall prevention member of yet another example.
Figure 28:
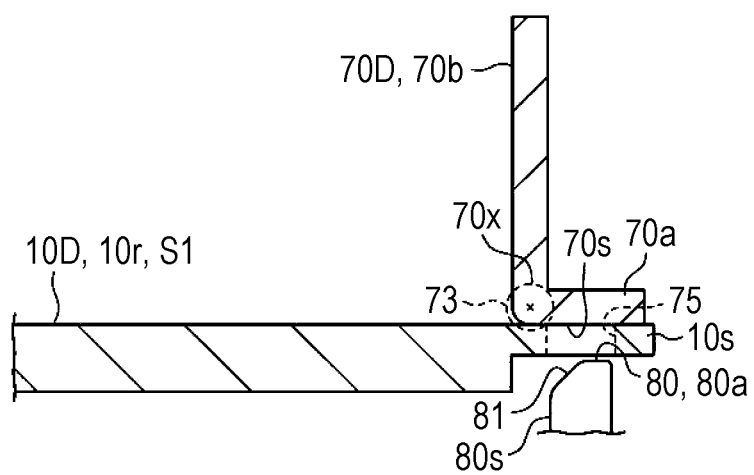
FIG. 28 is a cross-sectional view of the ramp device illustrating the fall prevention member of yet another example.

However, the present disclosure is not limited thereto, and for example, a fall prevention member 70D illustrated in FIGS. 27 and 28 has the rotation axis 70x at a position where the first flat plate portion 70a having the abutment surface 70s against the pressing member 80 and the second flat plate portion 70b orthogonal to the first flat plate portion 70a intersect each other. It may be configured to set the rotation axis 70x at a widthwise end portion of the top surface S1 of the ramp plate 10D. Even if such a configuration is adopted, it is possible to set the abutment surface 70s that faces downward in the standing state and facing sideways in the bent state.

In the above embodiment, the ramp device 11 includes the actuator 25 that uses the motor 23 as a drive source and the drive shoe 31 that moves in the extending direction of the guide rail 20 based on the driving force of the actuator 25. Further, the drive shoe 31 constitutes the moving body 21 in the ramp device 11, and the ramp device 11 includes the driven shoe 41 that is connected to the support arm 22 and moves in the extending direction of the guide rail 20 in conjunction with the drive shoe 31. By rotating the support arm 22 based on the movement of the drive shoe 31 along the extending direction of the guide rail 20, the rear end portion 10r of the ramp plate 10 connected to the support arm 22 is moved up and down.

However, the present disclosure is not limited thereto, and it may be configured to move the moving body 21 in the extending direction of the guide rail 20 based on, for example, a screwing relationship between a screw shaft rotated by driving a motor and a nut member screwed to the screw shaft, that is, a screw pair. Alternatively, it may be configured to move the moving body 21 in the extending direction of the guide rail 20 by using for example, an elastic member such as a compression spring. It may be configured to manually move the moving body 21 in the extending direction of the guide rail 20.

If it is configured such that the rear end portion 10r of the ramp plate 10 can be lifted up and lowered by the rotation of the support arm 22, the configuration of moving up and down the rear end portion 10r of the ramp plate 10 may be changed as appropriate. For example, the configuration that includes a lift-up actuator for rotating the support arm 22 may be applied. The configuration of manually moving up and down the rear end portion 10r of the ramp plate 10 may be applied.

While the pressing member 80 is formed at the front end portion 33f of the sub-shoe 33 constituting the moving body 21 together with the drive shoe 31 in the above embodiment, the pressing member 80 may be formed on, for example, the drive shoe 31. Alternatively, a support member independent of the moving body 21 is provided. The pressing member 80 is then formed on the support member. Consequently, it may be configured such that the pressing member 80 is disposed at a position where the pressing member 80 can abut against the fall prevention member 70 that moves downward together with the ramp plate 10 based on the rotation of the support arm 22 when the ramp plate 10 is in a deployed state.

A vehicle ramp device includes a ramp plate that is deployed at a lower end of a door opening, a moving body that moves in a deploying or retracting direction of the ramp plate, a support arm that is rotatably connected to the ramp plate and is rotatably connected to the moving body to allow a rear end portion of the ramp plate to be lifted up in a state where the ramp plate is deployed, a fall prevention member that is rotatably connected to the ramp plate, an urging member that urges the fall prevention member to make the fall prevention member stand on a side end portion of the ramp plate, and a pressing member that abuts against the fall prevention member that moves downward together with the ramp plate having been lifted up based on a rotation of the support arm and presses the fall prevention member to bend the fall prevention member on a top surface of the ramp plate against an urging force of the urging member.

With the above configuration, it is possible to bend the fall prevention member standing on the side end portion of the ramp plate by using an operation in which the rear end portion of the ramp plate, which has been lifted up, is moved downward by the rotation of the support arm. That is, the force to bend the fall prevention member does not affect the driving force required to move the ramp plate in the deploying or retracting direction together with the moving body and the support arm. As a result, the ramp plate can be moved in the deploying or retracting direction more smoothly.

Further, as the pressing member abuts against the fall prevention member that moves downward together with the ramp plate, the own weight of the ramp plate can be used. As a result, the fall prevention member can be easily bent.

There is no cam surface that is in sliding contact with the fall prevention member and bends the fall prevention member when the ramp plate of the conventional technique moves in the deploying or retracting direction, and thus the fall prevention member hardly wears and sliding noise hardly occurs. As a result, not only durability and quietness can be improved, but also high texture can be achieved. In addition, it is possible to avoid an increase in external dimensions due to a sliding contact member that forms the cam surface.

In the vehicle ramp device, the fall prevention member preferably includes an abutment surface against the pressing member, the abutment surface facing a bottom of the ramp plate when the fall prevention member stands and facing a side of the ramp plate when the fall prevention member is bent.

With the above configuration, the pressing member located below the abutment surface can efficiently press the fall prevention member that moves downward together with the ramp plate having been lifted up. After the fall prevention member is bent, the pressing member can efficiently keep the fall prevention member in a bent state by being located on the side of the abutment surface.

In the vehicle ramp device, the fall prevention member preferably includes a first flat plate portion having the abutment surface, and a second flat plate portion extending in a direction intersecting the first flat plate portion.

With the above configuration, it is possible to form the fall prevention member that has the abutment surface facing downward in a standing state and facing sideways in a bent state and that is bent on the top surface of the ramp plate.

In the vehicle ramp device, the fall prevention member is preferably bent with the first flat plate portion along a side end surface of the ramp plate and the second flat plate portion along the top surface of the ramp plate.

With the above configuration, it is possible to enhance the integrity of the fall prevention member bent on the top surface of the ramp plate and the ramp plate.

In the vehicle ramp device, the pressing member preferably has a curved surface that wraps around a side surface from a distal end portion projecting upward, and preferably abuts against the fall prevention member.

With the above configuration, it is possible to smoothly shift from a state where the distal end portion of the pressing member presses the fall prevention member to bend the fall prevention member to a state where the side surface of the pressing member abuts against the fall prevention member to hold the bent fall prevention member.

In the vehicle ramp device, the ramp plate preferably includes a hole portion that penetrates the side end portion of the ramp plate in a thickness direction, and the pressing member preferably abuts against the fall prevention member through the hole portion.

With the above configuration, it is possible to prevent the fall prevention member connected to the ramp plate from projecting to the widthwise outside of the ramp plate. As a result, it is possible to avoid the increase in external dimensions.

In the vehicle ramp device, the top surface of the ramp plate preferably includes a groove portion that houses the fall prevention member that is standing, and the hole portion is preferably formed in a bottom surface of the groove portion.

With the above configuration, it is possible to enhance the integrity of the fall prevention member standing on the side end portion and the ramp plate. Further, as the hole portion is formed in the groove portion, the hole portion does not stand out. Consequently, high designability can be achieved.

In the vehicle ramp device, the fall prevention member that is standing is preferably supported by an inner wall surface of the groove portion.

With the above configuration, the stability of the fall prevention member standing on the side end portion of the ramp plate can be improved.

In the vehicle ramp device, the pressing member is preferably provided integrally with the moving body.

With the above configuration, the pressing member moves in the deploying direction of the ramp plate together with the ramp plate connected to the moving body. As a result, the pressing member can be appropriately located at a position where the pressing member can abut against the fall prevention member that moves downward together with the ramp plate when the ramp plate is in a deployed state.

Further, as the pressing member moves in the retracting direction of the ramp plate together with the ramp plate, the state where the pressing member abuts against the bent fall prevention member can be kept. As a result, the ramp plate can be moved in the deploying or retracting direction more stably while being integrated with the fall prevention member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle ramp device comprising:
a ramp plate that is deployed at a lower end of a door opening;
a moving body that moves in a deploying or retracting direction of the ramp plate;
a support arm that is rotatably connected to the ramp plate and is rotatably connected to the moving body to allow a rear end portion of the ramp plate to be lifted up in a state where the ramp plate is deployed;
a fall prevention member that is rotatably connected to the ramp plate;
an urging member that urges the fall prevention member to make the fall prevention member stand on a side end portion of the ramp plate; and
a pressing member that abuts against and presses the fall prevention member to bend the fall prevention member on a top surface of the ramp plate against an urging force of the urging member when the ramp plate moves downward based on a rotation of the support arm.

2. The vehicle ramp device according to claim 1, wherein the fall prevention member includes an abutment surface against the pressing member, the abutment surface facing a bottom of the ramp plate when the fall prevention member stands and facing a side of the ramp plate when the fall prevention member is bent.

3. The vehicle ramp device according to claim 2, wherein the fall prevention member includes
a first flat plate portion having the abutment surface, and
a second flat plate portion extending in a direction intersecting the first flat plate portion.

4. The vehicle ramp device according to claim 3, wherein the fall prevention member is bent with the first flat plate portion along a side end surface of the ramp plate and the second flat plate portion along the top surface of the ramp plate.

5. The vehicle ramp device according to claim 2, wherein the pressing member has a curved surface that wraps around a side surface from a distal end portion projecting upward, and abuts against the fall prevention member.

6. The vehicle ramp device according to claim 1, wherein the ramp plate includes a hole portion that penetrates the side end portion of the ramp plate in a thickness direction, and
the pressing member abuts against the fall prevention member through the hole portion.

7. The vehicle ramp device according to claim 6, wherein the top surface of the ramp plate includes a groove portion that houses the fall prevention member that is standing, and the hole portion is formed in a bottom surface of the groove portion.

8. The vehicle ramp device according to claim 7, wherein the fall prevention member that is standing is supported by an inner wall surface of the groove portion.

9. The vehicle ramp device according to claim 1, wherein the pressing member is provided integrally with the moving body.

* * * * *